(12) United States Patent
Lu et al.

(10) Patent No.: US 11,750,088 B2
(45) Date of Patent: Sep. 5, 2023

(54) PFC CIRCUIT, CONTROL METHOD THEREOF AND POWER CONVERSION DEVICE

(71) Applicant: Delta Electronics (Shanghai) Co.,Ltd., Shanghai (CN)

(72) Inventors: Cheng Lu, Shanghai (CN); Hongyang Wu, Shanghai (CN); Wenfei Hu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 7 days.

(21) Appl. No.: 17/656,213

(22) Filed: Mar. 23, 2022

(65) Prior Publication Data
US 2022/0311330 A1    Sep. 29, 2022

(30) Foreign Application Priority Data
Mar. 26, 2021   (CN) .......................... 202110324032.7

(51) Int. Cl.
*H02M 1/42*      (2007.01)
*H02M 7/219*     (2006.01)
*H02M 7/487*     (2007.01)

(52) U.S. Cl.
CPC ......... *H02M 1/4233* (2013.01); *H02M 7/219* (2013.01); *H02M 7/487* (2013.01); *H02M 1/4208* (2013.01)

(58) Field of Classification Search
CPC .................................................. H02M 7/219
See application file for complete search history.

(56) References Cited

U.S. PATENT DOCUMENTS 7,605,570 B2 * 10/2009 Liu .................... H02M 1/4225
                                                          363/127
9,685,883 B2 *  6/2017 Huang ................. H02M 7/219
(Continued)

FOREIGN PATENT DOCUMENTS

CN      111900889 A      11/2020

OTHER PUBLICATIONS

Jun-Seok Kim et al., "High-Efficiency Bridgeless Three-Level Power Factor Correction Rectifier", IEEE Transactions on Industrial Electronics, vol. 64, No. 2, Feb. 2017.

*Primary Examiner* — Gary A Nash
(74) *Attorney, Agent, or Firm* — CKC & Partners Co., LLC

(57) ABSTRACT

The application provides a method for controlling a PFC circuit including a diode bridge arm, DNPC bridge arm and capacitor group connected in parallel. The control method includes: switching working mode of the PFC circuit back and forth between first mode and third mode via second mode in each switching cycle when positive half cycle of a modulation wave is modulated, and switching working mode of the PFC circuit back and forth between sixth mode and fourth mode via fifth mode in each switching cycle when negative half cycle of the modulation wave is modulated. The durations of the second and fifth modes are as short as possible, thereby decreasing a current flowing into or out from midpoint of the capacitor group, and reducing voltage fluctuation at the midpoint. The application further provides a PFC circuit using the control method and a power conversion device having the PFC circuit.

17 Claims, 15 Drawing Sheets

(56) References Cited

U.S. PATENT DOCUMENTS

| | | | | |
|---|---|---|---|---|
| 2005/0237771 A1* | 10/2005 | Franck | .................. | H02M 7/219 |
| | | | | 363/84 |
| 2013/0194698 A1* | 8/2013 | Sase | .................... | H02M 1/4258 |
| | | | | 363/21.02 |
| 2017/0155313 A1* | 6/2017 | Mao | .................... | H02M 1/4208 |
| 2017/0338735 A1* | 11/2017 | Alarcon-Cot | ....... | H02M 1/4225 |
| 2018/0076729 A1* | 3/2018 | Usami | .................... | H02M 1/36 |

\* cited by examiner (a)

(b)

(c)

(d)

(e)

(f)

US 11,750,088 B2

PFC CIRCUIT, CONTROL METHOD THEREOF AND POWER CONVERSION DEVICE

CROSS-REFERENCE TO RELATED APPLICATIONS

This non-provisional application claims priority under 35 U.S.C. § 119(a) on Patent Applications No. 202110324032.7 filed on Mar. 26, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The application relates to the technology of voltage modulation, and specifically to a quasi-two-level voltage modulation strategy, a PFC circuit using the modulation strategy, and a power conversion device having the PFC circuit.

BACKGROUND

With the development of the distributed new energy power generation technology and the increasing requirement of the DC power devices, the demand for a low voltage DC distribution is growing. The normal solution converts a medium voltage alternating current (MVAC) into a low voltage alternating current (LVAC) using an AC transformer, and then converts the LVAC into a low voltage direct current (LVDC) using an AC/DC converter. A Power Electronic Transformer (PET) is a power conversion device for converting the MVAC to the LVDC by using a high frequency isolated circuit. Compared to the normal solution using a normal grid-frequency AC transformer, the PET has a higher power density and efficiency.

The circuit of a PET generally includes a two-stage circuit. The pre-stage circuit uses cascaded AC/DC converters for converting the MVAC into corresponding DC outputs with relative high voltage. The pre-stage circuit is also referred to as a CHB structure. The post-stage circuit uses DC/DC converters for converting the DC voltage with relative high amplitude into the LVDC with high frequency isolation. The outputs of the plurality of DC/DC converters are connected in parallel. Each pair of the AC/DC converter and the DC/DC converter forms a modularized power conversion unit. However, each power conversion unit shall be equipped with medium voltage isolated transformer, insulators, mechanical components, fiber optical connector, and so on. The more units are used, the system becomes more complex with higher cost. Since the commercial semiconductor devices are normally with low voltage withstand, a three-level topology of the power conversion unit is selected to improve the DC-Link voltage level of the AC/DC converter (>1.5 kV), thereby reducing the number of the cascaded AC/DC units.

The three-level AC/DC converter is widely used in various applications, especially a bidirectional five-level circuit formed by two diode neutral point clamped (DNPC) bridge arms is widely applied. As shown in FIG. 1, the circuit is formed by eight switches and four clamped diodes. The bidirectional topology is symmetric in structure, flexible in controlling, and available to operate in four quadrants. However, the bidirectional five-level circuit constructed by a lot of devices, thus costs a lot. It is more appropriate to use a unidirectional AC/DC topology for a PET system under the application scenarios with a unidirectional power flow, such as data center.

A bridgeless DNPC three-level topology shown in FIG. 2 includes two bridge arms. The left bridge arm is a diode half-bridge, the right bridge arm is a DNPC bridge arm. The circuit is formed by four switches S1-S4, two clamped diodes Dp and Dn, and two diodes D1 and D2 for rectifying. The advantages of the solution are: on the one hand, the required components are reduced, thus the cost is reduced. On the other hand, since an operating current only flows through three components at any time, the conduction loss becomes small, thus increase the efficiency.

A method known to the inventors, the bridgeless DNPC three-level topology works in six modes (+2 mode, +1 mode, +0 mode, −2 mode, −1 mode and −0 mode), and the working mode switches only between the adjacent two modes in each switching cycle, such as, switch from the +2 mode to +1 mode, or switch from the +1 mode to +0 mode. A potential of a midpoint of a branch consisted by capacitors that is connected between DC-Link (DC-Link capacitor) suffers from large fluctuation during a grid-frequency cycle by using the modulation method. Because the +1 mode always participates during the modulation progress of a positive half cycle of a modulation wave, i.e., the operating current always flows into the midpoint of the DC-Link capacitor branch (neutral point) during the +1 mode. In a negative half cycle of the modulation wave, the −1 mode always participates the modulation progress, i.e., the current always flows out from the midpoint of the DC-Link capacitor branch (neutral point) during the −1 mode. To ensure the safe operation of the switches, the voltage fluctuation is required to be controlled, thus DC-Link capacitors with large capacitance is required to absorb the large grid-frequency fluctuation at the neutral point.

SUMMARY

The present disclosure provides a control method, a PFC circuit and a power conversion device for reducing a large voltage fluctuation of the neutral point during modulation with the bridgeless DNPC three-level topology.

In accordance of one aspect of the application, a method for controlling a PFC circuit is provided. The PFC circuit comprises a diode bridge arm, a diode neutral point clamped (DNPC) bridge arm and a capacitor group. The diode bridge arm, the DNPC bridge arm and the capacitor group are electrically connected in parallel. The DNPC bridge arm comprises four switches and a clamped diode branch. The four switches comprise a first switch, a second switch, a third switch and a fourth switch connected in series sequentially. A first connection node is defined by the junction node between the first switch and the second switch. A second connection node is defined by the junction node between the third switch and the fourth switch. One end of the clamped diode branch is connected to the first connection node; the other end of the clamped diode branch is connected to the second connection node. A midpoint of the clamped diode branch is coupled to a midpoint of the capacitor group. The control method comprises: switching a working mode of the PFC circuit back and forth between a first mode and a third mode via a second mode in each switching cycle at times when a positive half cycle of a modulation wave is modulated; switching the working mode of the PFC circuit back and forth between a sixth mode and a fourth mode via a fifth mode in each switching cycle at times when a negative half cycle of the modulation wave is modulated; in the first mode, the first switch and the second switch in the DNPC bridge arm are in on-state; in the second mode, the third switch in the DNPC bridge arm is in on-state; in the third mode, the third switch and the fourth switch in the DNPC bridge arm are in on-state; an input current of the PFC circuit flows into a neutral point of the DNPC bridge arm during the positive half cycle; in the sixth mode, the third switch and the fourth switch in the DNPC bridge arm are in on-state; in the fifth mode, the second switch in the DNPC bridge arm is in on-state; in the fourth mode, the first switch and the second switch in the DNPC bridge arm are in on-state; the input current flows out from the neutral point of the DNPC bridge arm during the negative half cycle.

In accordance of another aspect of the application, a PFC circuit is further provided. The PFC circuit comprises a diode bridge arm, a diode neutral point clamped (DNPC) bridge arm and a capacitor group. The diode bridge arm comprises a first diode and a second diode. The first diode and the second diode are connected in series. The junction node of the first diode and the second diode is defined as a midpoint of the diode bridge arm. The DNPC bridge arm is connected in parallel to the diode bridge arm. The DNPC bridge arm comprises a first switch, a second switch, a third switch and a fourth switch and a clamped diode branch. The first switch, the second switch, the third switch and the fourth switch connected in series sequentially. A first connection node is defined by the junction node between the first switch and the second switch. A second connection node is defined by the junction node between the third switch and the fourth switch. One end of the clamped diode branch is connected to the first connection node, and the other end of the clamped diode branch is connected to the second connection node. The capacitor group is connected in parallel to the diode bridge arm and the DNPC bridge arm. The capacitor group comprises a first capacitor and a second capacitor connected in series. A junction node of the first capacitor and the second capacitor is defined as a midpoint of the capacitor group. The midpoint of the clamped diode branch is coupled to the midpoint of the capacitor group; The PFC circuit further comprises a controller. The controller is configured to switch the working modes of the PFC circuit. The controller is configured to control the working mode of the PFC circuit switching back and forth between first mode and third mode via second mode in each switching cycle at times when a positive half cycle of a modulation wave is modulated, and control the working mode of the PFC circuit switching back and forth between sixth mode and fourth mode via fifth mode in each switching cycle at times when a negative half cycle of the modulation wave is modulated. In the first mode, the first switch and the second switch in the DNPC bridge arm are in on-state; in the second mode, the third switch in the DNPC bridge arm is in on-state; in the third mode, the third switch and the fourth switch in the DNPC bridge arm are in on-state; an input current of the PFC circuit flows into a neutral point of the DNPC bridge arm during the positive half cycle; and in the sixth mode, the third switch and the fourth switch in the DNPC bridge arm are in on-state, in the fifth mode; the second switch in the DNPC bridge arm is in on-state; in the fourth mode, the first switch and the second switch in the DNPC bridge arm are in on-state; the input current flows out from the neutral point of the DNPC bridge arm during the negative half cycle.

In accordance of another aspect of the application, a power conversion device is provided. The power conversion device comprises a power conversion unit that comprises the PFC circuit provided in the another aspect of the application, a first bridge arm, a second bridge arm, a transformer and a secondary circuit. The first bridge arm is connected in parallel to the first capacitor of the PFC circuit and comprises a fifth switch and a sixth switch connected in series. The second bridge arm is connected in parallel to the second capacitor of the PFC circuit and comprises a seventh switch and an eighth switch connected in series; The transformer comprises a primary winding and a secondary winding. One end of the primary winding is connected to a junction node between the fifth switch and the sixth switch, the other end of the primary winding is connected to a junction node between the seventh switch and the eighth switch. The secondary circuit is connected to the secondary winding of the transformer.

DETAILED DESCRIPTION

Figure 1:
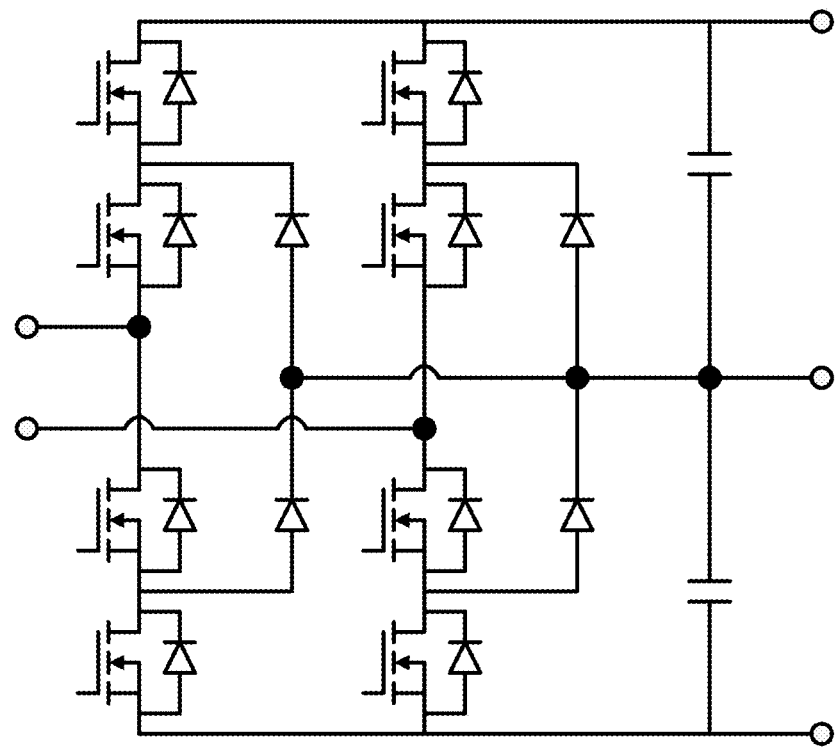
FIG. 1 illustrates a circuit diagram of a bidirectional five-level topology.

Now various embodiments of the application are described in details, and one or more examples in these embodiments are illustrated in the drawings. In the description of the drawings, the same reference sign denotes the same component or factor, and only differences of the respective embodiments are described. Each example is provided in an explanation way, instead of limitation to the range of the application. In addition, partial illustrated or described feature of one embodiment may be used in other embodiments, or combined with other embodiments to produce another embodiment. The description aims to comprise such modification and variation.

Hereinafter a bridgeless DNPC three-level circuit as a PFC circuit 10 is described with FIG. 2.

Figure 2:
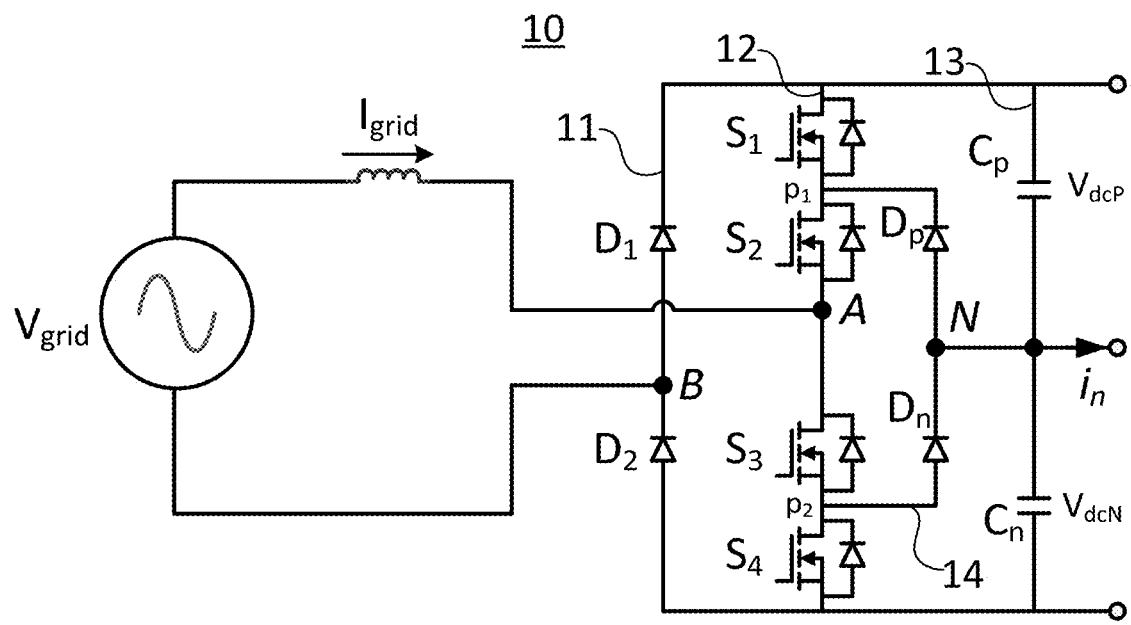
FIG. 2 illustrates a PFC circuit according to some embodiments of the application.

As shown in FIG. 2, the PFC circuit 10 comprises a diode bridge arm 11, a DNPC bridge arm 12 and a capacitor group 13 connected in parallel. The diode bridge arm 11 comprises two rectifier diodes D1 and D2 operating at grid frequency connected in series, the DNPC bridge arm 12 comprises a first switch S1, a second switch S2, a third switch S3 and a fourth switch S4 connected in series sequentially, and a capacitor group 13 comprises a first capacitor Cp and a second capacitor Cn connected in series (Cp and Cn also referred to as DC-Link capacitor). In addition, the DNPC bridge arm further comprises a clamped diode branch 14 comprising two clamped diode Dp and Dn, one end of the clamped diode branch 14 connect to a connection node p1 between the series connected first switch S1 and the second switch S2, and the other end of the clamped diode branch 14 connect to a connection node p2 between the third switch S3 and the fourth switch S4. A neutral point N is defined by the connection of a midpoint of the clamped diode branch 14 and a midpoint of the capacitor group 13. It shall be noticed that the application does not limit the type of the first to fourth switches S1-S4, such as MOSFET or IGBT or other types of semiconductor switching devices.

In the PFC circuit 10, a midpoint of the DNPC bridge arm 12 is defined as a node A (i.e., a connection node between the series connected second switch S2 and the third switch S3), and a midpoint of the diode bridge arm 11 is defined as a node B (i.e., a connection node between the series connected rectifier diodes D1 and D2 connected). Based on the above definitions, an input voltage between the bridge arms of the PFC circuit 10 may be defined as a port voltage $V_{AB}$, i.e., a voltage between node A and node B. In addition, a direction of a grid current $I_{grid}$ (an input current) flowing into the node A and out from the node B is defined as a positive direction of an input current, and a direction of a neutral point current $i_n$ flowing out from the node N is defined as a positive direction.

Figure 3:
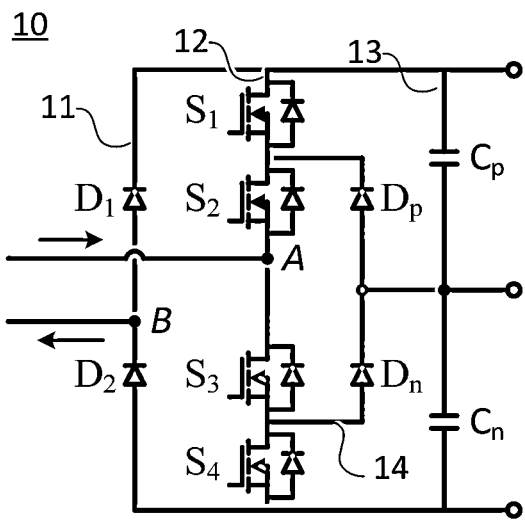
FIG. 3 illustrates schematic diagrams of working modes according to the PFC circuit shown in FIG. 2.
Figure 3:
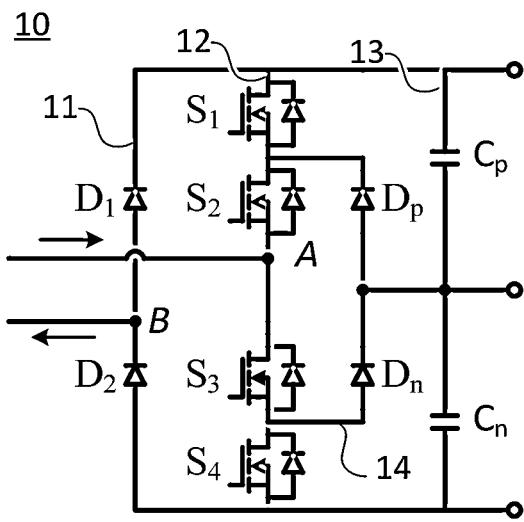
Figure 3:
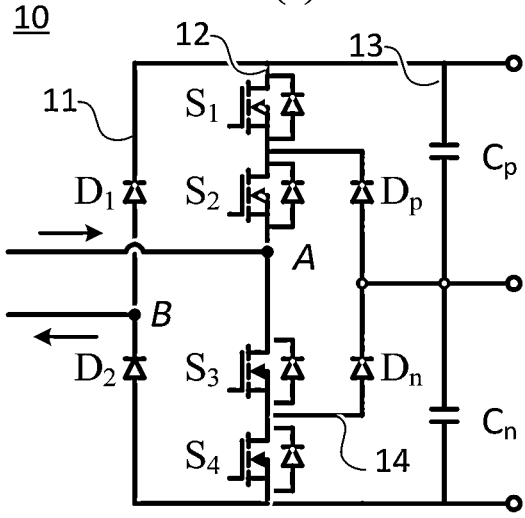
Figure 3:
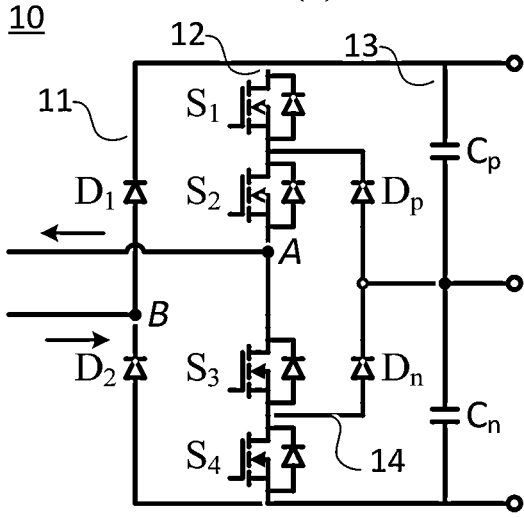
Figure 3:
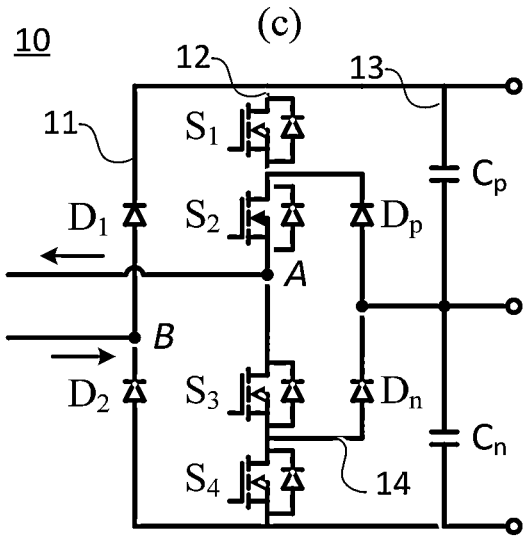
Figure 3:
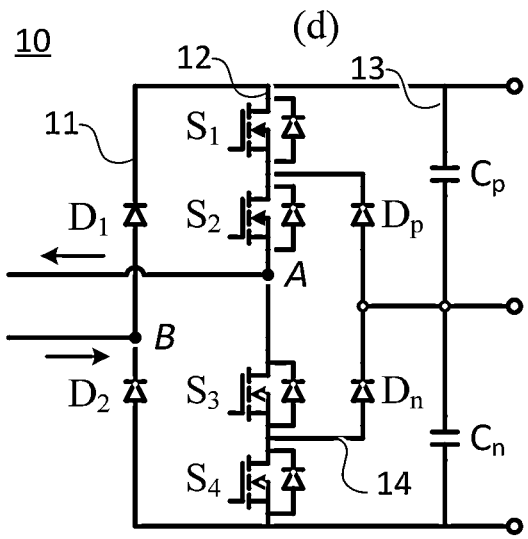

Referring to FIG. 3, six working modes of the PFC circuit 10 during operation are described.

The six working modes are a first mode, a second mode, a third mode, a forth mode, a fifth mode and a sixth mode, which are also respectively referred to as +2 mode, +1 mode, +0 mode, −0 mode, −1 mode and −2 mode according to the DC-Link voltage level.

During a positive half grid frequency cycle of a modulation wave, the rectifier diode D2 conducts, the input current flows into the node A of the DNPC bridge arm 12 and out of the node B of the diode bridge arm 11, and it means that the input current is in the positive direction.

As shown in FIG. 3(a), when the PFC circuit 10 operates under +2 mode, the input current flows through the first switch S1 and the second switch S2 of the DNPC bridge arm 12, and the first capacitor Cp and the second capacitor Cn of the capacitor group 13, the port voltage $V_{AB}$ of the PFC circuit 10 is $(V_{dcP}+V_{dcN})$ and defined as +2 level, wherein $V_{dcP}$ is a voltage on the first capacitor Cp, $V_{dcN}$ is a voltage on the second capacitor Cn. As shown in FIG. 3(b), when the PFC circuit 10 operates under +1 mode, the input current flows through the third switch S3, the clamped diode Dn and the second capacitor Cn, the port voltage $V_{AB}$ is $V_{dcN}$ and defined as +1 level. As shown in FIG. 3(c), when the PFC circuit 10 operates under +0 mode, the input current flows through the third switch S3 and the fourth switch S4 only, the port voltage V is 0 and defined as +0 level.

During a negative half grid frequency cycle of the modulation wave, the rectifier diode D1 conducts, the input current flows into the node B of the diode bridge arm 11 and out of the node A of the DNPC bridge arm, it means that the input current is in the negative direction.

As shown in FIG. 3(d), when the PFC circuit 10 operates under −2 mode, the input current flows through the first capacitor Cp and the second capacitor Cn of the capacitor group 13, the third switch S3 and the fourth switch S4 of the DNPC bridge arm 12, the port voltage $V_{AB}$ is $-(V_{dcP}+V_{dcN})$ and defined as −2 level. As shown in FIG. 3(e), when the PFC circuit 10 operates under −1 mode, the input current flows through the first capacitor Cp, the clamped diode Dn and the second switch S2, the port voltage $V_{AB}$ is $-V_{dcN}$ and defined as −1 level. As shown in FIG. 3(f), when the PFC circuit 10 operates under −0 mode, the input current flows through the first switch S1 and the second switch S2, the port voltage V is 0 and defined as −0 level.

Figure 4:
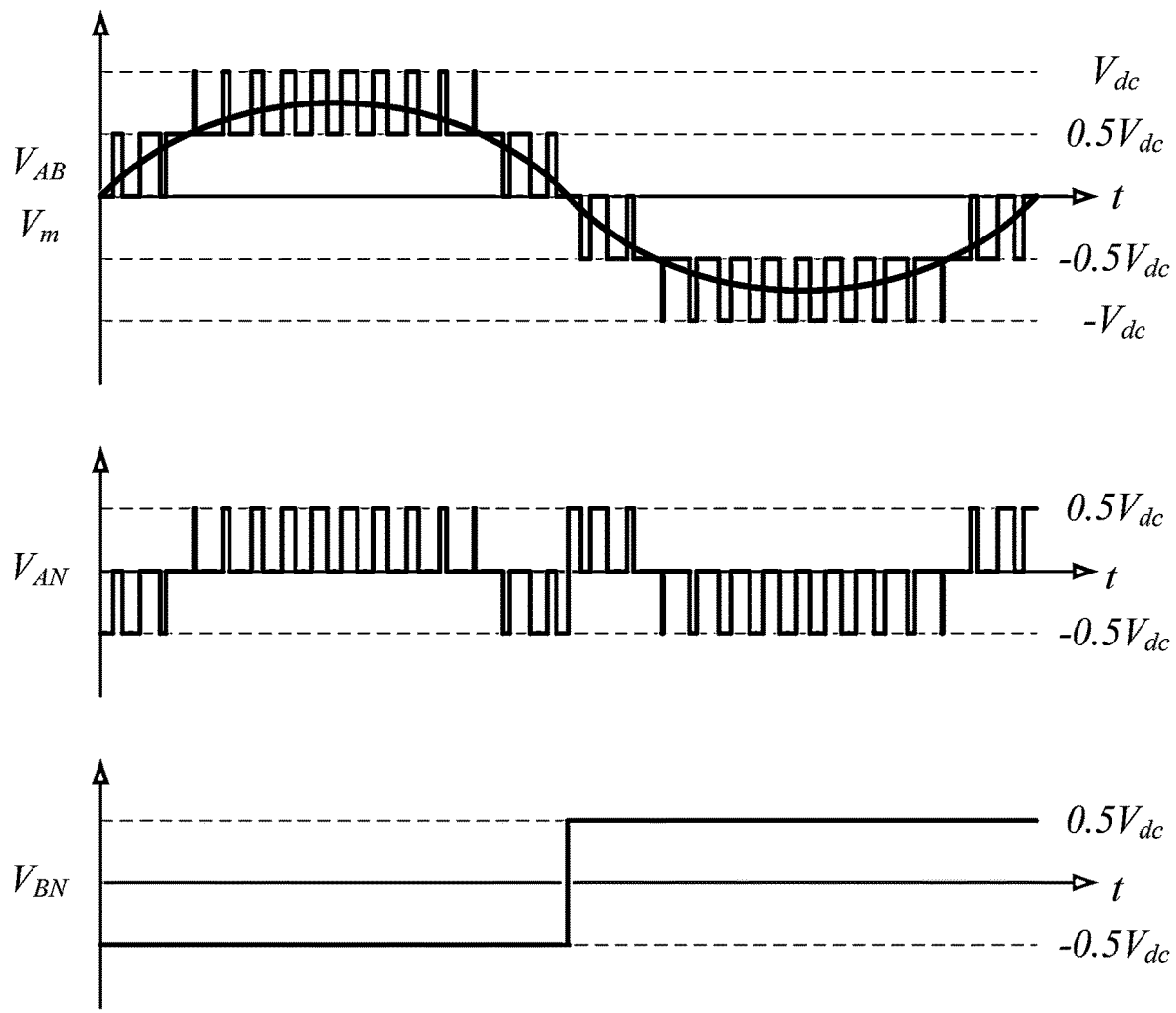
FIG. 4 illustrates voltage waveforms when the modulation strategy known to the inventors is applied to the PFC circuit shown in FIG. 2.

Referring to FIG. 4, FIG. 4 shows voltage waveforms of the PFC circuit shown in FIG. 2 using a modulation strategy known to the inventor. As shown in FIG. 4, the term "modulation" used in this application refers to a process of fitting the port voltage $V_{AB}$ of the PFC circuit 10 to the modulation wave (e.g., a sine curve of a voltage Vm shown in FIG. 4) by controlling the durations of each working mode of the PFC circuit described above in FIG. 3.

As shown in FIG. 4, the PFC circuit 10 is controlled to operate by switching back and forth between the +1 mode and the +2 mode, and by controlling the duty cycles of the +1 mode and the +2 mode to modulate the port voltage $V_{AB}$ of the PFC circuit 10, when a value of modulation wave is between $0.5V_{dc}$ and $V_{dc}$; when the value of modulation wave is between 0 and $0.5V_{dc}$, the PFC circuit 10 is controlled to operate by switching back and forth between the +1 mode and the +0 mode, and by controlling the duty cycles of the +1 mode and the +0 mode to modulate the $V_{AB}$; when the value of modulation wave is between $-0.5V_{dc}$ and $-V_{dc}$, the PFC circuit 10 is controlled to operate by switching back and forth between the −1 mode and the −2 mode, and by controlling the duty cycles of the −1 mode and the −2 mode to modulate the $V_{AB}$; When the value of the modulation wave is between 0 and $-0.5V_{dc}$, the PFC circuit 10 is controlled to operate by switching back and forth between the −1 mode and the −0 mode, and by controlling the duty cycles of the −1 mode and the −0 mode to modulate the $V_{AB}$. In addition, FIG. 4 also illustrates voltage waveforms of the $V_{AN}$ and the $V_{BN}$, wherein $V_{AN}$ is the voltage between the node A and the neutral point N and $V_{BN}$ is the voltage between the node B and the neutral point N.

Figure 5:
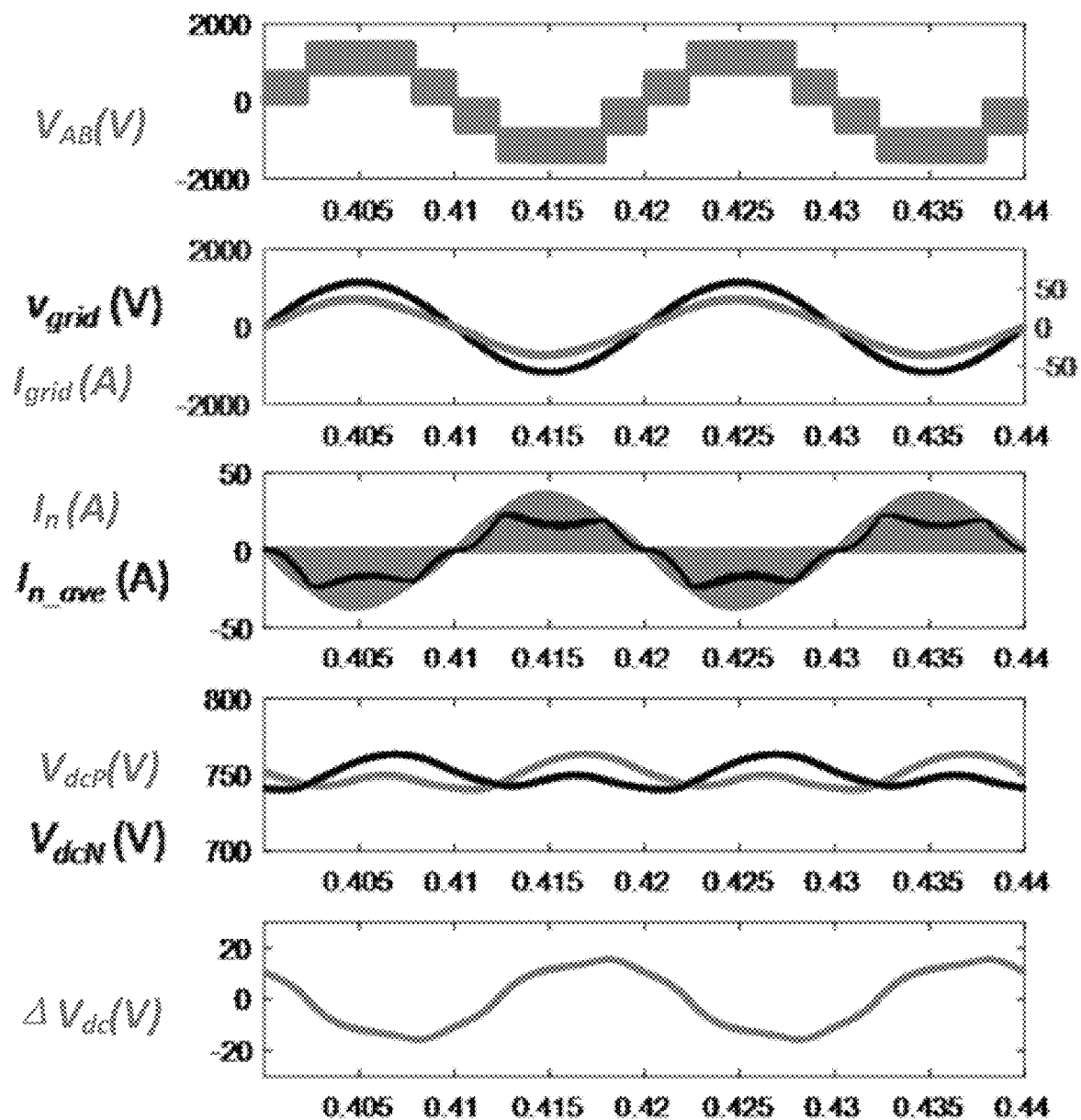
FIG. 5 illustrates simulation waveforms when the modulation strategy known to the inventors is applied to the PFC circuit shown in FIG. 2.

FIG. 5 shows the simulation waveforms of a PFC circuit using the modulation strategy illustrated in FIG. 4. In the FIG. 5, the grid current $I_{grid}$ and a grid voltage $V_{grid}$ have the same phase, i.e., the power factor is 1, but a potential at the neutral point N suffers from a fluctuation with large amplitude during the grid frequency cycle. The voltage fluctuation at the neutral point N is defined as $4V_{dc}=V_{dcP}-V_{dcN}$. When the value of the DC-Link capacitor is 1.5 mF, the simulated voltage fluctuation of the neutral point N is 30V. This is due to the fact that when the grid current is positive, the +1 mode is always involved in the modulation, and the current always flows into the neutral point N at the +1 mode during the positive half grid frequency cycle; when the grid current is negative, the −1 mode is always involved in the modulation, and the current always flows out of the neutral point N at the −1 mode during the negative half grid frequency cycle. Since capability of the switches to withstand the voltage stress is limited, the voltage fluctuation of the first capacitor Cp and the second capacitor Cn shall not be too large, thus a large DC-Link capacitor is required to absorb the large grid-frequency fluctuation at the neutral point N. The inventor recognized that a high capacitance is required by using the modulation strategy described above. The volume of the DC-Link capacitor is large and costs a lot.

The application proposes a quasi-two-level modulation strategy based on the PFC circuit 10 shown in FIG. 2. The modulation strategy can significantly reduce the voltage fluctuation at the neutral point of the capacitor group, saving the amount of capacitance, while allowing a very small effective value of the current flowing through the clamped diode, which can save the capacity of the clamping diode, reduce the device cost, and reduce the conduction loss of the clamped diode and improve the efficiency of the PFC circuit.

Figure 6A:
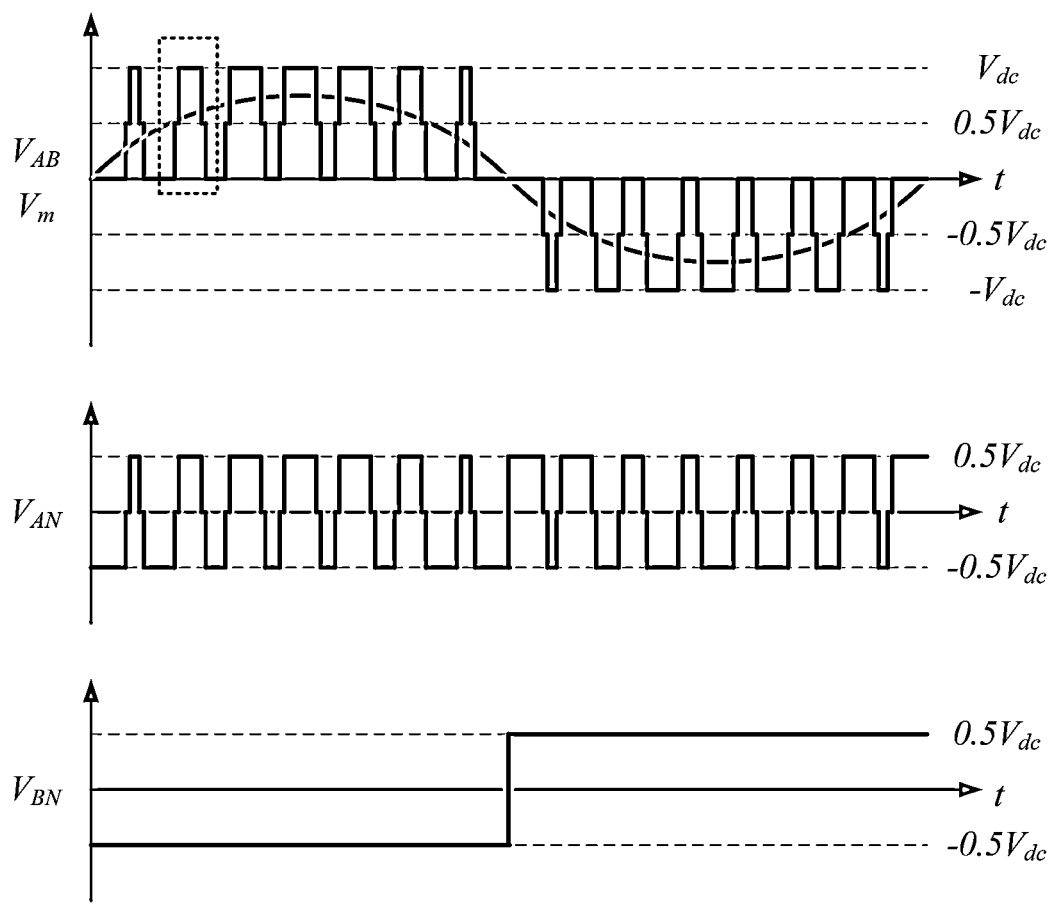
FIG. 6A illustrates voltage waveforms according to some embodiments of the modulation strategy of the application is applied to the PFC circuit shown in FIG. 2.

FIG. 6A illustrates a quasi-two-level modulation strategy based on the PFC circuit 10 shown in FIG. 2 according to an embodiment of the application. Similar to the modulation progress described above in FIG. 4, the embodiment modulates the port voltage $V_{AB}$ of the PFC circuit to fit the modulation wave (e.g., a sinewave voltage $V_m$ shown in FIG. 6A) by controlling the durations of various working modes of the PFC circuit described in FIG. 3. Different from the modulation strategy adopted shown in FIG. 4, the modulation strategy embodiment of the application reduces the current flowing into or out of the neutral point N by shortening the operating duration under the +1 mode and the −1 mode, thereby reducing the voltage fluctuation at the neutral point. Hereinafter the detailed modulation process will be described.

As shown in FIG. 6A of the embodiment, when the value of $V_m$ is between 0 and $V_{dc}$, in each switching cycle, the working mode of the PFC circuit is switched back and forth between the +2 mode and the +0 mode temporarily via the +1 mode for modulation, i.e., when the working mode of PFC circuit is switched back and forth between the +2 mode and the +0 mode, the PFC circuit operates under the +1 mode for an extremely short time. Similarly, when the value of $V_m$ is between 0 and $-V_{dc}$, in each switching cycle, the working mode of the PFC circuit is switched back and forth between the −2 mode and the −0 mode temporarily via the −1 mode, i.e., when the working mode of PFC circuit is switched between the −2 mode and the −0 mode, the PFC circuit operates under the −1 mode for an extremely short time.

As shown in FIG. 6A of the embodiment, assuming that the voltage $V_{dcP}$ of the first capacitor Cp and the voltage $V_{dcN}$ of the second capacitor Cn are equal, which are both $0.5V_{dc}$, and the voltage $V_{AN}$ is switched between $+0.5V_{dc}$ (referred to as +1 level) and $-0.5V_{dc}$ (referred to as −1 level) in each switching cycle, and transits through the 0 level for an extremely short time. Since the rectifier diode D2 is always on, the voltage $V_{BN}$ is kept at $-0.5V_{dc}$ when the value of the modulation wave $V_m$ is between 0 and $V_{dc}$, On the contrary, when the value of the modulation wave is between 0 and $-V_{dc}$, the rectifier diode D1 is always on, and thus the voltage $V_{BN}$ is kept at $+0.5V_{dc}$. The port voltage of the PFC circuit $V_{AB}$ can be obtained by combining the voltages $V_{AN}$ and $V_{BN}$.

Figure 6B:
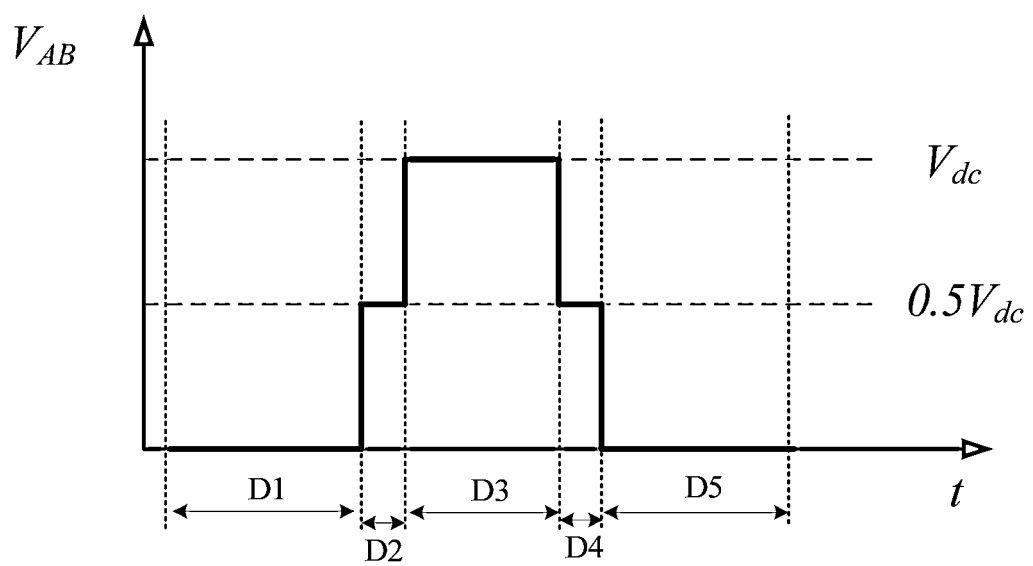
FIG. 6B is a partial enlarged diagram of FIG. 6A.

FIG. 6B illustrates an enlarged diagram in a dashed box of FIG. 6A. For example, in FIG. 6B, one switching cycle represents the period of switching the working mode of PFC circuit 10 form from the +0 mode to the +2 mode via the +1 mode and then from the +2 mode to the +0 mode via +1 mode. In each switching cycle, during D1 and D5 operates the PFC circuit under the +0 mode, during D2 and D4 operates the PFC circuit under the +1 mode, and the PFC circuit operates under the +2 mode during D3. In other embodiments that combined with the previous embodiment of the application, each duration of D2 and D4 does not exceed 10% of one switching cycle (D1+D2+D3+D4+D5), such as 5%, and even 1%, i.e., a duration of D2+D4 does not exceed 20% of one switching cycle (D1+D2+D3+D4+D5), such as 10%, or 5%, and even 1%. While guaranteeing the commutation of the PFC circuit, the shorter duration of the PFC circuit operating under the +1 mode, the smaller the impact on the voltage fluctuation at the neutral point.

Similarly, in the embodiment, when the PFC circuit is switched back and forth between the −2 mode and the −0 mode, the PFC circuit transits through the −1 mode for an extremely short time. Moreover, for example, the −1 mode does not exceed 20% of one switching cycle, such as 10%, or 5%, and even 1%. To sum up, while guaranteeing the commutation of the PFC circuit, the shorter duration of the −1 mode, it is more advantageous to reduce the voltage fluctuation at the neutral point.

Since the working mode of the PFC circuit is switched back and forth between the +0 mode and the +2 mode, or switched back and forth between the −0 mode and the −2 mode in each switching cycle, the durations of the +1 mode and the −1 mode, that function as transition modes, is quite short in compare with the switching cycle, thus the current flowing into or out of the neutral point (the neutral point N in FIG. 2) is very small, which may largely reduce the voltage fluctuation at the neutral point, and the current flowing through the clamped diodes Dp and Dn also becomes very small, which can save the capacity of the clamping diode and reduce the device cost.

Figure 7:
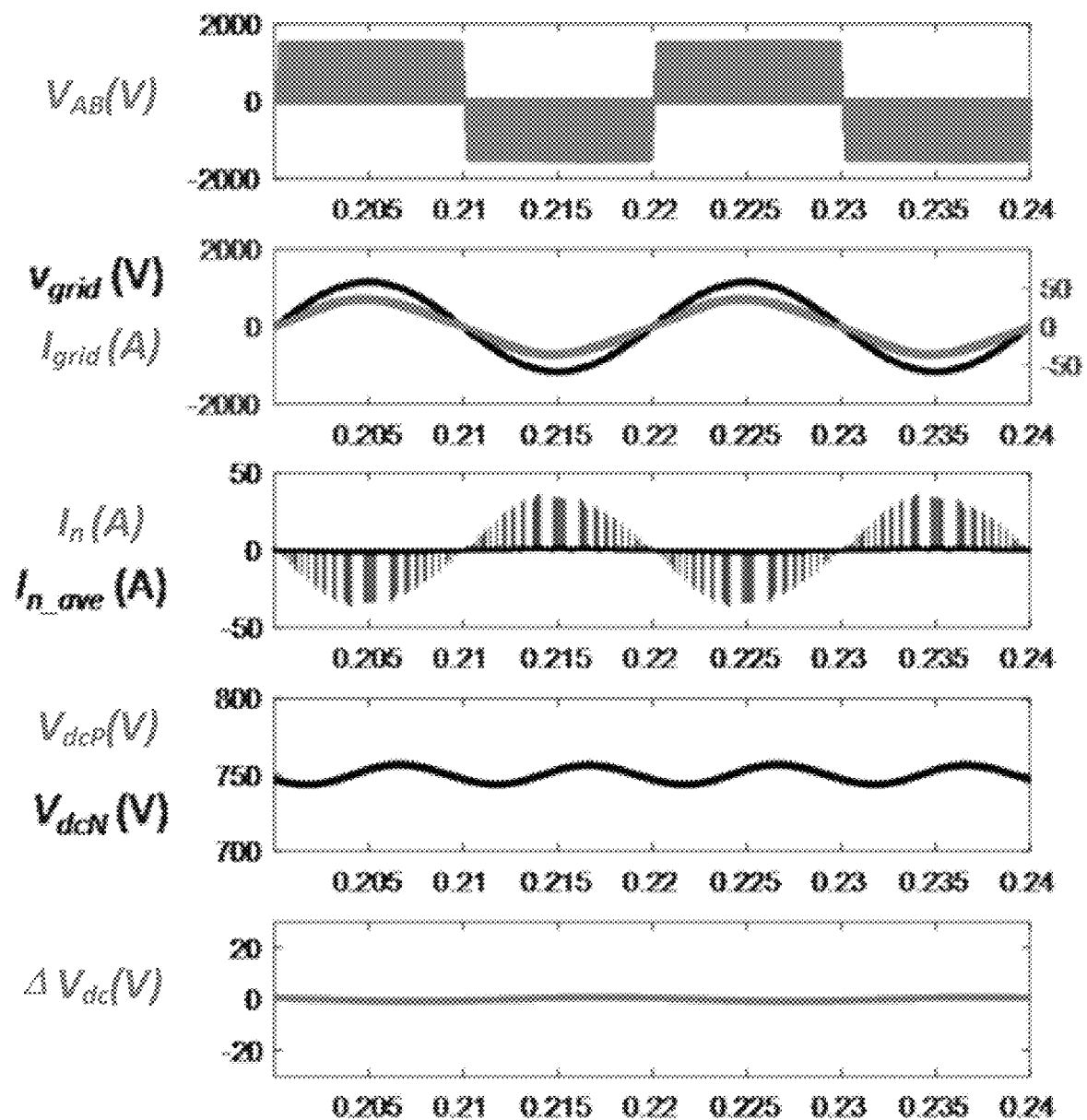
FIG. 7 illustrates simulation waveforms according to one embodiment of the modulation strategy of the application is applied to the PFC circuit shown in FIG. 2.

FIG. 7 illustrates simulation waveforms of a PFC circuit using the modulation strategy shown in FIG. 6A. Compared to the simulation waveforms of the circuit using the modulation strategy shown in FIG. 4, in FIG. 7, the grid current $I_{grid}$ is in phase with the grid voltage $V_{grid}$, the operating duration under the +1 mode or −1 mode is quite short, thus the grid current only flows into or out of the neutral point for an extremely short time, an effective value of the current flows into or out of the neutral point is extremely small. Similarly, when a value of the DC-Link capacitor is 1.5 mF, the voltage fluctuation $\Delta V_{dc}$ at the neutral point is only 1.5V, which is reduced by 95% as compared to the $\Delta V_{dc}$ shown in FIG. 5. In other words, under the same requirement of the voltage ripple on the neutral point, the use of the quasi two-level modulation strategy in FIG. 6A can largely reduce the amount of the DC-Link capacitor, reduce the cost and decrease the size of the capacitor group.

By using the quasi two-level modulation strategy shown in FIG. 6A, the voltage $V_{AN}$ of the DNPC bridge arm is switched back and forth between $0.5V_{dc}$ and $-0.5V_{dc}$ in each switching cycle, with a transition through the 0 level in between. The switching sequence of the four switches of the DNPC bridge arm should be reasonably designed to ensure the safety of the devices, otherwise there might be a risk of overvoltage of the switches. Hereinafter the switching sequence of the four switches of the DNPC bridge arm under the quasi two-level modulation strategy proposed in the application is further described.

Figure 8:
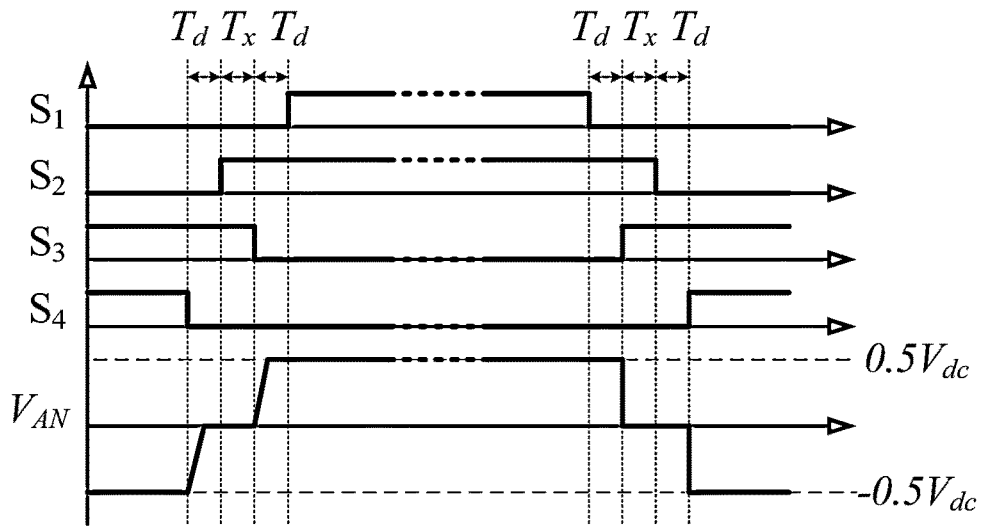
FIG. 8 illustrates a switching sequence of some embodiments of the application for the switches of DNPC bridge.

FIG. 8 illustrates a switching sequence of the switches of a DNPC bridge arm (the switches S1-S4 of the DNPC bridge arm 12 of the PFC circuit 10 in FIG. 2) according to one embodiment of the application. As shown in FIG. 8, the control signals of the first switch S1 and the third switch S3 are complementary, the control signals of the second switch S2 and the fourth switch S4 are complementary, the dead time is $T_d$. In some embodiments, the dead time $T_d$ between the first switch S1 and the third switch S3 is greater than or equal to the commutation time of the first switch S1 or the third switch S3, and the dead time $T_d$ between the second switch S2 and the fourth switch S4 is greater than or equal to the commutation time of the second switch S2 or the fourth switch S4. Further referring to FIG. 6A and FIG. 8, a process of switching the bridge arm voltage $V_{AN}$ of the DNPC bridge arm from $-0.5V_{dc}$ to $0.5V_{dc}$ corresponds to a process of switching the working mode of the PFC circuit from the +0 mode to the +2 mode (when the input current is in the positive direction) or switching from the −2 mode to the −0 mode (when the input current is in the negative direction) in FIG. 6A. During this process, the fourth switch S4 is firstly turned off, then the second switch S2 is turned on, then the third switch S3 is turned off, and finally the first switch S1 is turned on, the overlapping time that the second switch S2 and the third switch S3 are both turned on is defined as $T_x$. Similarly, a process of switching the bridge arm voltage $V_{AN}$ of the DNPC bridge arm from $0.5V_{dc}$ to $-0.5V_{dc}$ corresponds to a process of switching the working mode of PFC circuit from the +2 mode to the +0 mode (when the input current is in the positive direction) or switching from the −0 mode to the −2 mode (when the input current is in the negative direction) in FIG. 6A. During this process, the first switch S1 is firstly turned off, then the third switch S3 is turned on, then the second switch S2 is turned off, and finally the fourth switch S4 is turned on. The switching sequence ensures the outer switches (i.e., the first switch S1 and the fourth switch S4 settled on the outer side of the DNPC bridge arm) commute first with a voltage stress of $0.5V_{dc}$ on the switches, and the inner switches (i.e., the second switch S2 and the third switch S3 settled on the inner side of the DNPC bridge arm) commute later that avoiding an overvoltage of the switches. Moreover, such switching sequence is universal in the positive and negative half cycles of the current. The switching sequence does not dependent on the recognition of the input current direction and is symmetrical within one switching cycle, which is easily implemented.

Figure 9:
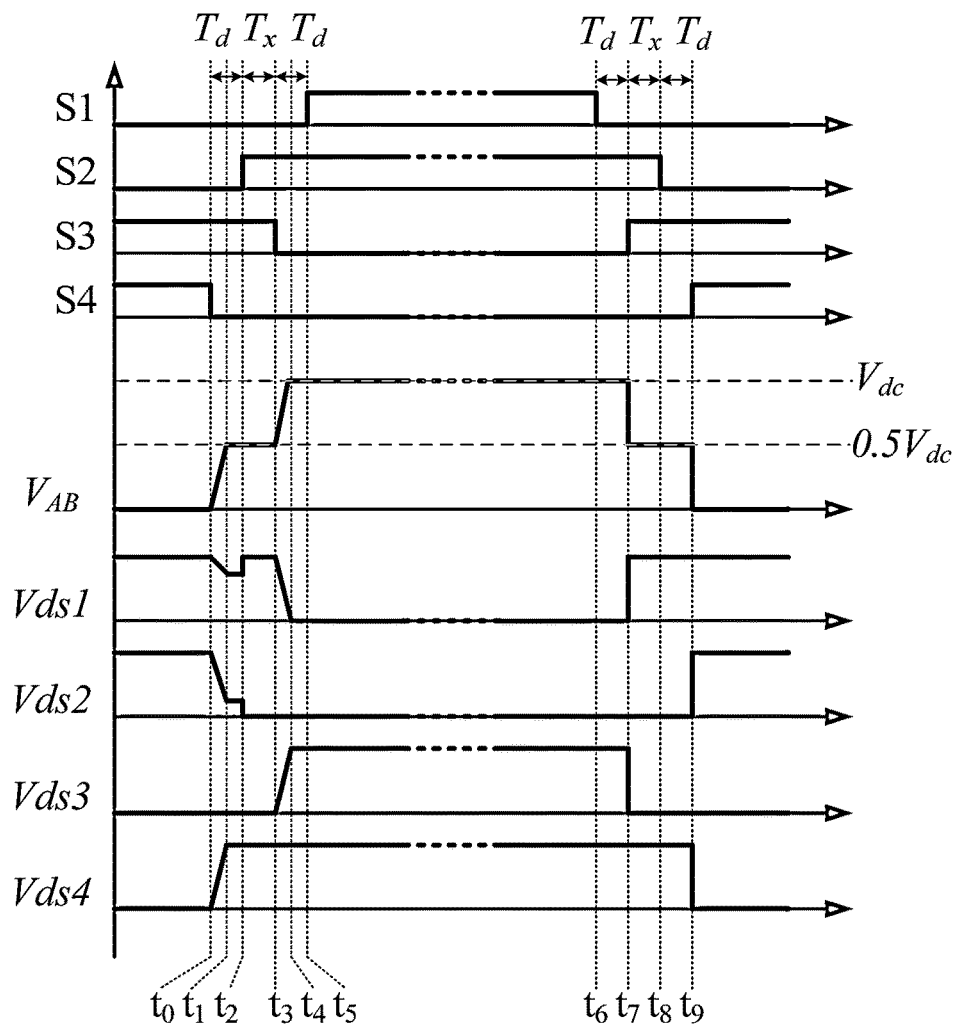
FIG. 9 illustrates voltage waveforms of the respective switches according to the switching sequence in FIG. 8.

Hereinafter take one switching cycle within the positive half cycle of the current as an example, and describes the switching sequence of the application in combination with FIG. 9, FIG. 10A-10G and FIG. 11A-11E. FIG. 9 illustrates timing of driving signals for the first to fourth switches S1-S4, and illustrates the voltage V and voltages $V_{ds1}$-$V_{ds4}$ of the first to fourth switches S1-S4 at different times during the positive half cycle. FIGS. 10A-10G and 11A-11E illustrate the working state of the PFC circuit at different times during the positive half cycle.

Figure 10A:
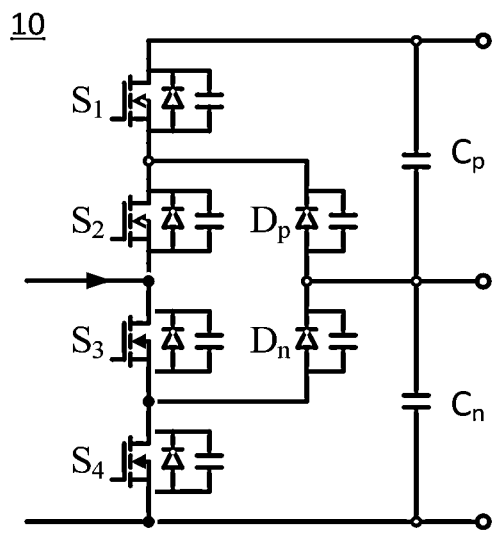
FIGS. 10A to 10G illustrate schematic diagrams of working modes from +0 mode to +2 mode according to the switching sequence shown in FIG. 8.
Figure 10B:
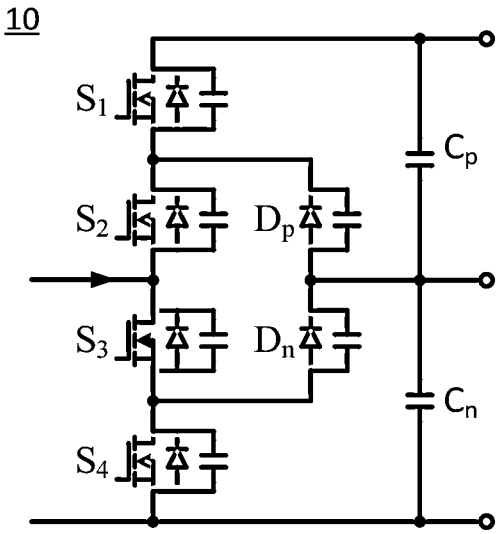
Figure 10C:
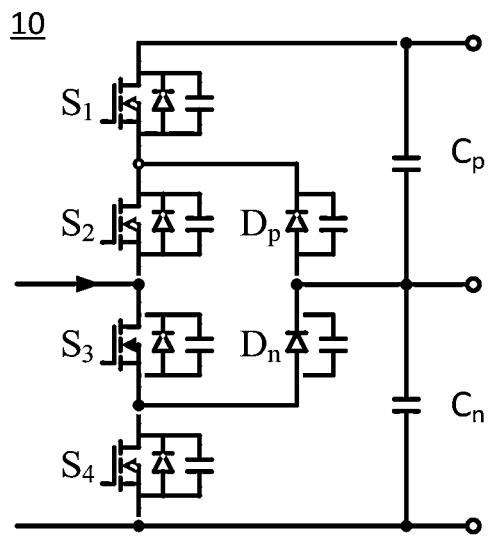
Figure 10D:
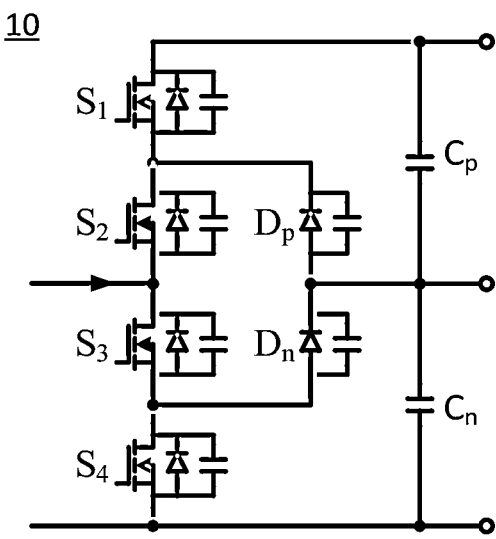
Figure 10E:
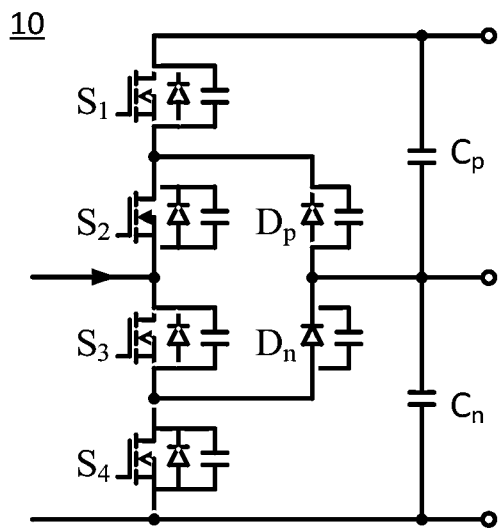
Figure 10F:
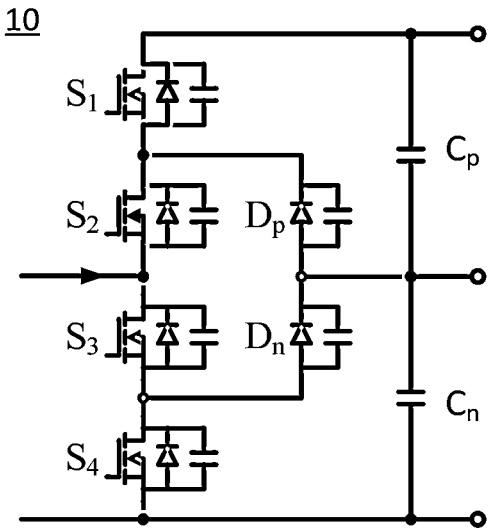
Figure 10G:
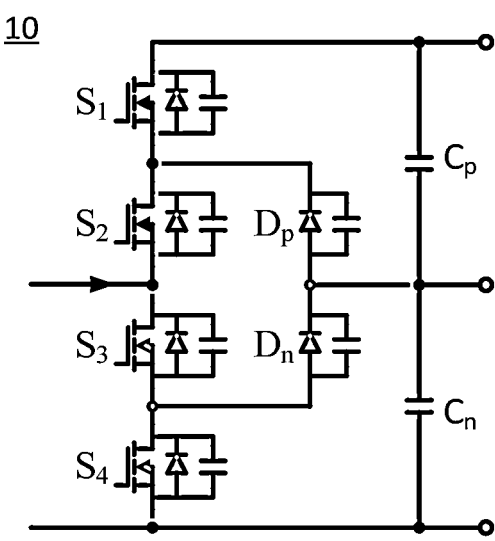

Firstly, the process of switching the working mode of the PFC circuit from the +0 mode to the +2 mode is described, and the switching sequence of the switches in the PFC circuit is shown by the left half part of FIG. 9. Referring to FIG. 10A, before time $t_0$, the third switch S3 and the fourth switch S4 are turned on, current flows through the third switch S3 and the fourth switch S4, and the port voltage V is 0. At time $t_0$, as shown in FIG. 10B, the fourth switch S4 is turned off, the current cannot continue to flow through the fourth switch S4, and then the current charges a parasitic capacitor of the fourth switch S4, and a junction capacitor of the clamped diode $D_n$ is discharged, a junction capacitor of the first switch S1 and the second switch S2 is discharged at the same time. In this process, $V_{ds4}$ is increased, and $V_{ds1}$ and $V_{ds2}$ are decreased. The parallel connection of the first switch S1 and the clamped diode $D_p$ results in a large equivalent capacitance and a low discharge rate, thus $V_{ds1}$ is higher than $V_{ds2}$. As shown in FIG. 10C, the discharging process ends at time $t_1$. At t1, $V_{ds4}=0.5V_{dc}$, $V_{ds1}+V_{ds2}=0.5V_{dc}$, the junction capacitor of the clamped diode $D_n$ is discharged to 0. During t1 to t2 the current flows through the third switch S3 and the clamped diode $D_n$, the fourth switch S4 completes the commutation first and its voltage is clamped to $0.5V_{dc}$. As shown in FIG. 10D, at time $t_2$, the second switch S2 is turned on, $V_{ds2}$ is decreased instantly to 0 and $V_{ds1}$ is increased instantly to $0.5V_{dc}$, the current still flows through the third switch S3 and the clamped diode $D_n$. As shown in FIG. 10E, at time $t_3$, the third switch S3 is turned off, thus the current cannot continue to flow through the third switch S3, and the current charges a junction capacitor of the third switch S3, the junction capacitor of the first switch S1 is discharged. Since $V_{ds4}$ has reached $0.5V_{dc}$, the voltage on the third switch S3 won't be charged to an overvoltage. As shown in FIG. 10F, at time $t_4$, $V_{ds3}$ is increased to $0.5V_{dc}$, $V_{ds1}$ is decreased to 0, and the current flows through the second switch S2 and a body diode of a first switch S1, the working mode of PFC circuit is switched to the +2 mode. Finally, as shown in FIG. 10G, at time $t_5$, the first switch S1 is turned on, and the current flows through the first switch S1 and the second switch S2.

Figure 11A:
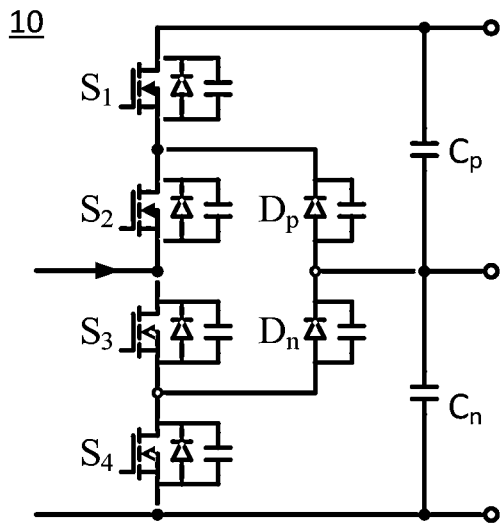
FIGS. 11A to 11E illustrate schematic diagrams of working modes of a PFC-circuit switched from +2 mode to +0 mode according to the switching sequence shown in FIG. 8.
Figure 11B:
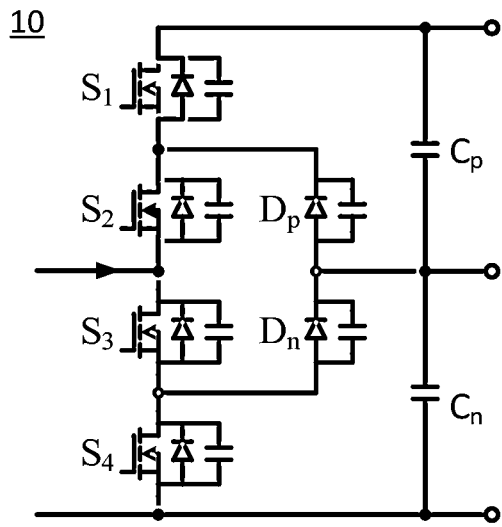
Figure 11C:
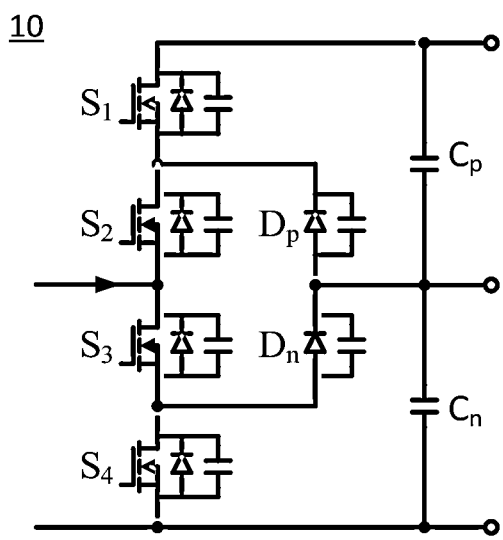
Figure 11D:
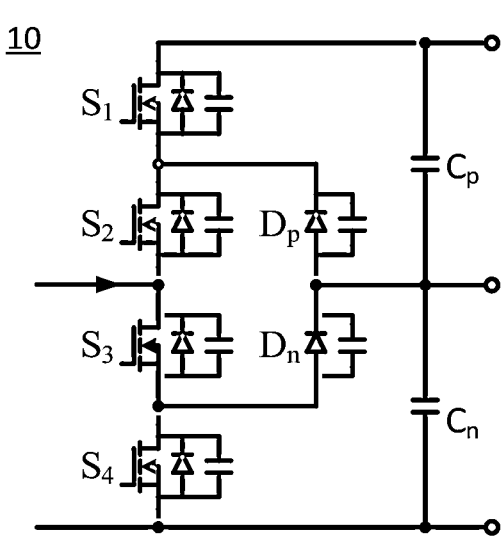
Figure 11E:
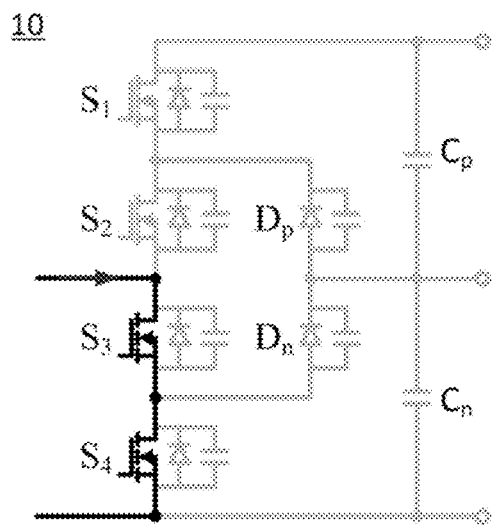

Next, the process of switching the working mode of the PFC circuit from the +2 mode to the +0 mode is described, and the switching sequence of the switches in the PFC circuit is shown by the right half part of FIG. 9. Referring to FIG. 11A, the PFC circuit is operating under the +2 mode until $t_6$ while the first switch S1 and the second switch S2 are turned on, and the third switch S3 and the fourth switch S4 take a voltage of $0.5V_{dc}$, respectively. As shown in FIG. 11B, at time $t_6$, the first switch S1 is turned off, the current can still flow through the body diode of the first switch S1, the working mode of the PFC circuit remains unchanged. As shown in FIG. 11C, at time $t_7$, the third switch S3 is turned on, the potential on the midpoint of the DNPC bridge arm is higher than the potential on the neutral point of the capacitor group, the clamped diode Dn is on, the current flows through the third switch S3 and the clamped diode Dn, and the potential at the midpoint of the DNPC bridge arm is equal to the potential at the neutral point of the capacitor group, thus the voltage of the first switch S1 is pulled up instantly to $0.5V_{dc}$, a port voltage $V_{ds3}$ of the third switch S3 is 0, the first switch S1 of the DNPC bridge arm completes commutation firstly, and its voltage is clamped to $0.5V_{dc}$. As shown in FIG. 11D, at time $t_8$, the second switch S2 is turned off, and the current still flows through the third switch S3 and the clamped diode Dn, and the working mode of the PFC circuit keeps unchanged. As shown in FIG. 11E, at time $t_9$, the fourth switch S4 is turned on, a potential $V_{AN}$ is directly pulled down to $-V_{dc}$, and the current flows through the third switch S3 and the fourth switch S4. At t9, $V_{ds4}$ is decreased to 0, $V_{ds2}$ is increased to $0.5V_{dc}$, and since $V_{ds1}$ has reached $0.5V_{dc}$, the second switch S2 won't be overcharged.

In the switching sequence shown in FIG. 9, FIG. 10A-10G and FIG. 11A-11E, the dead time $T_d$ between the complementary switches (for example, the first switch S1 and the third switch S3 are controlled to switch complementarily, and the second switch S2 and the fourth switch S4 are controlled to switch complementarily) should be greater than or equal to a time required for commutation of the switches, and a time interval Tx between turning on the second switch S2 and turning off the third switch S3 should be greater than 0 and as small as possible or equal to 0. An operating duration under +1 mode is between $T_x$ and $(T_x+T_d)$, the $T_x$ and $T_d$ should be as small as possible, such that on the premise of satisfying safe commutation, a duration in the +1 mode is reduced, and minimize the current flowing into the neutral point, thereby reducing voltage fluctuation at the neutral point. In some embodiments, when the working mode of the PFC circuit is switched from the +0 mode to the +2 mode, the time interval Tx between turning on the second switch S2 and turning off the third switch S3 is less than or equal to 10% of the switching cycle, such as 5%, and even 1%. Moreover, when the working mode of the PFC circuit is switched from the +2 mode to the +0 mode, a time interval between turning on the third switch S3 and turning off the second switch S2 is less than or equal to 10% of the switching cycle, such as 5%, and even 1%.

Figure 12:
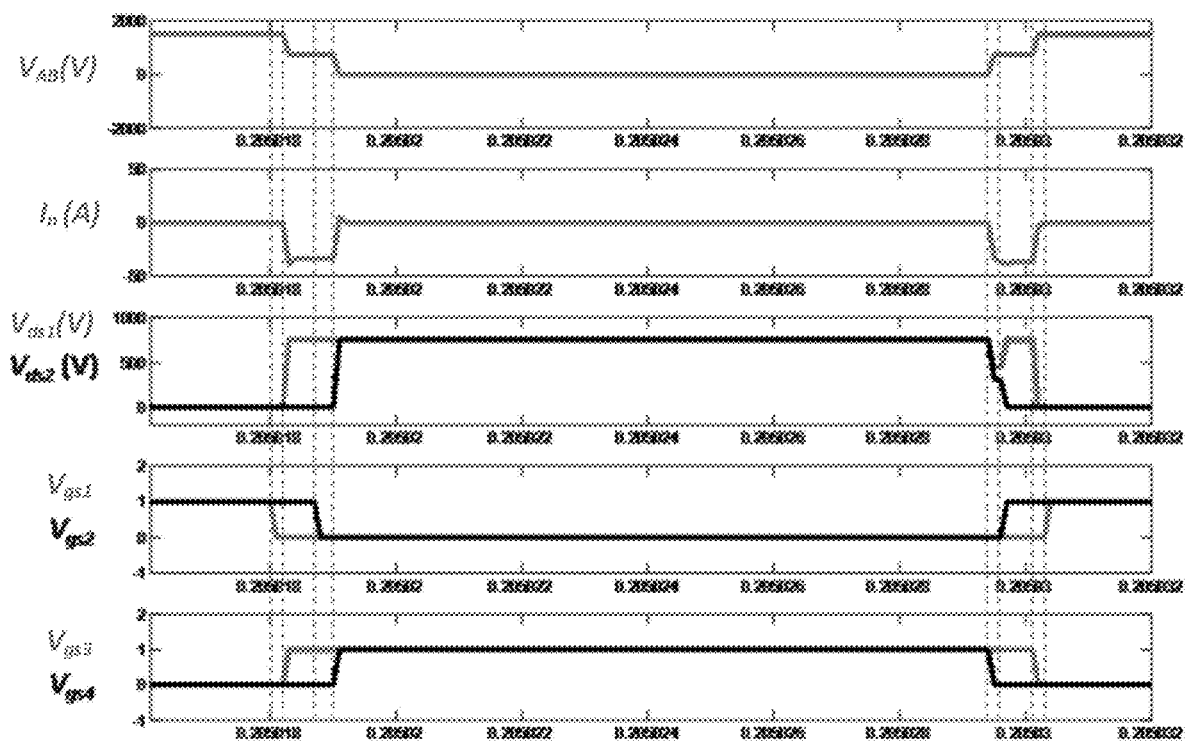
FIG. 12 illustrates simulation waveforms when a switching sequence for switches of DNPC bridge is applied according to the FIG. 8.

FIG. 12 is the simulation waveforms of a circuit using the switching sequence shown in FIG. 9. In one switching cycle, the switching process between the +0 mode and the +2 mode is completely consistent with theoretical analysis. The voltage stress on the switches does not exceed $0.5V_{dc}$, the switching process is safe and reliable. The duration of the +1 mode is quite short, about 1 μs, and the input current (here means the grid current) only flows into the neutral point during the transition process of switching the voltage levels.

By taking one switching cycle of the positive half cycle of the modulation wave as an example, a switching cycle under the quasi-two-level modulation strategy of the application has been described with FIG. 9 to FIG. 12 above. Similarly, in one switching cycle of the negative half cycle of the modulation wave, when the working mode PFC circuit is switched from the −2 mode to the −0 mode via the −1 mode, firstly the fourth switch S4 is turned off, then the second switch S2 is turned on, then the third switch S3 is turned off and finally the first switch S1 is turned. Moreover, when the PFC circuit is switched from the −0 mode to the −2 mode via the −1 mode, firstly the first switch S1 is turned off, then the third switch S3 is turned on, then the second switch S2 is turned off and finally the fourth switch S4 is turned on. In addition, when the PFC circuit is switched from the −2 mode to the −0 mode, a time interval between turning on the second switch S2 and turning off the third switch S3 is less than or equal to 10% of the switching cycle, such as 5%, and even 1%. Furthermore, when the PFC circuit is switched from the −0 mode to the −2 mode, a time interval between turning on the third switch S3 and turning off the second switch S2 is less than or equal to 10% of the switching cycle, such as 5%, and even 1%, such that on the premise of satisfying safe conversion, the duration of the −1 mode is reduced, and minimizes the current flowing out from the neutral point, thereby reducing the voltage fluctuation on the neutral point.

Figure 13:
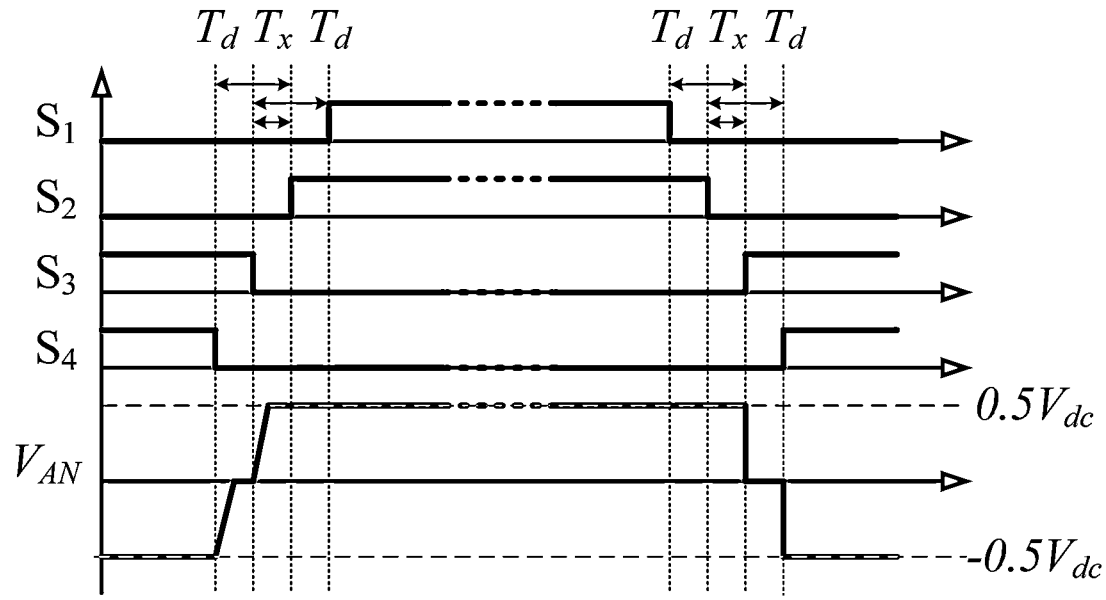
FIG. 13 illustrates a switching sequence of some embodiments of the application for the switches of DNPC bridge.

FIG. 13 illustrates a switch sequence of switches in a DNPC bridge arm according to some other embodiments of the application. As shown in FIG. 13, the control signals of the first switch S1 and the third switch S3 are complementary, the control signals of the second switch S2 and the fourth switch S4 are complementary, and the dead time is $T_d$. In some embodiments, the dead time $T_d$ between the first switch S1 and the third switch S3 is greater than or equal to a commutation time of the first switch S1 or the third switch S3, and the dead time $T_d$ between the second switch S2 and the fourth switch S4 is greater than or equal to a commutation time of the second switch S2 or the fourth switch S4. Further, referring to FIG. 6A and FIG. 13, a process of switching a bridge arm voltage $V_{AN}$ of the DNPC bridge arm from $0.5V_{dc}$ to $-0.5V_{dc}$ corresponds to the process of switching the working mode of PFC circuit from the +2 mode to the +0 mode (when the input current is in the positive direction) or switching from the −0 mode to the −2 mode (when the input current is in the negative direction) shown in FIG. 6A. During the process, the first switch S4 is firstly turned off, then the second switch S2 is turned off, the third switch S3 is turned on, and finally the fourth switch S4 is turned on. A process of switching the bridge arm voltage $V_{AN}$ of the DNPC bridge arm from $-0.5V_{dc}$ to $0.5V_{dc}$ corresponds to a process of switching the PFC circuit from the +0 mode to the +2 mode (when the input current is in the positive direction) or switching from the −2 mode to the −0 mode (when the input current is in the negative direction) shown in FIG. 6A. During this process, the fourth switch S4 is firstly turned off, then the third switch S3 is turned off, the second switch S2 is turned on, and finally the first switch S1 is turned on. A time interval between turning off the third switch S3 and turning on the second switch S2, or a time interval between turning off the second switch S2 and turning on the third switch S3 is $T_x$. In some embodiments, when the working mode of the PFC circuit is switched from the +0 mode to the +2 mode, the time interval $T_x$ between turning off the third switch S3 and turning on the second switch S2 is less than or equal to 10% of the switching cycle, such as 5%, and even 1%. When the working mode of the PFC circuit is switched from the +2 mode to the +0 mode, the time interval $T_x$ between turning off the second switch S2 and turning on the third switch S3 is less than or equal to 10% of the switching cycle, such as 5%, and even 1%. When the working mode of the PFC circuit is switched from the −2 mode to the −0 mode, the time interval $T_x$ between turning off the third switch S3 and turning on the second switch S2 is less than or equal to 10% of the switching cycle, such as 5%, and even 1%. Moreover, when the working mode of the PFC circuit is switched from the −0 mode to the −2 mode, the time interval $T_x$ between turning off the second switch S2 and turning on the third switch S3 is less than or equal to 10% of the switching cycle, such as 5%, and even 1%, such that on the premise of satisfying safe conversion, a time of duration of the +1 mode or the −1 mode is reduced, and the current flowing into or out from the neutral point N is minimized, thereby reducing voltage fluctuation on the neutral point.

Figure 14:
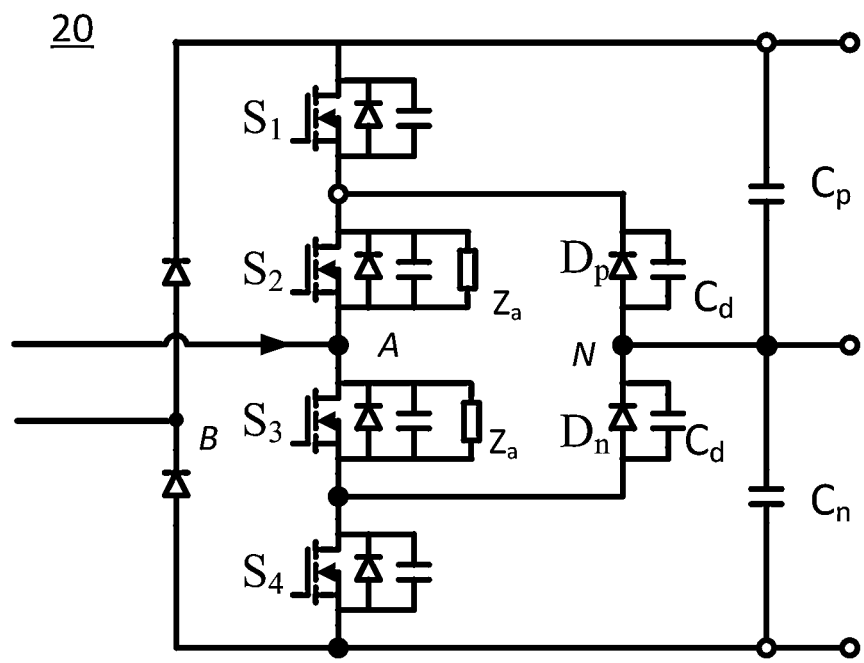
FIG. 14 illustrates a PFC circuit for the embodiments of the application according to FIG. 13.

As compared to the switching sequence shown in FIG. 8, the switching sequence of FIG. 13 has a risk that the voltage stress on the switches settled on the inner side of the DNPC bridge arm (i.e., the second switch S2 and the third switch S3) may exceed $0.5V_{dc}$. In order to prevent this risk, as shown in a PFC circuit 20 of FIG. 14, an impedance $Z_a$ is connected in parallel to each of the switches settled on the inner side of the DNPC bridge arm (i.e., the second switch S2 and the third switch S3), such that a charging current of the internal switches is reduced during the commutation process, and a charging rate is lower than that of the outer switches, thus allowing the outer switches to complete the commutation and clamping its voltage firstly and ensuring that the voltage stress of the inner switches does not exceed $0.5V_{dc}$. A value of the parallel impedance $Z_a$ satisfies the following formula:

$$Z_a \leq \frac{1}{j\omega C_d} \quad (1)$$

wherein $Z_a$ is resistance of the parallel impedance, $C_d$ is capacitance of a parasitic capacitance of a clamped diode Dp or Dn in the clamped diode branch.

The quasi two-level modulation strategy described above based on the PFC circuit 10 shown in FIG. 2, and the switching sequence of the four switches on the DNPC bridge arm are proposed in the application. The states of the four switches on the DNPC bridge arm can be controlled by a control mechanism, such as, a controller (not shown), comprised in the PFC circuit 10, thereby realizing the quasi two-level modulation strategy and the switching sequence described above.

Figure 15:
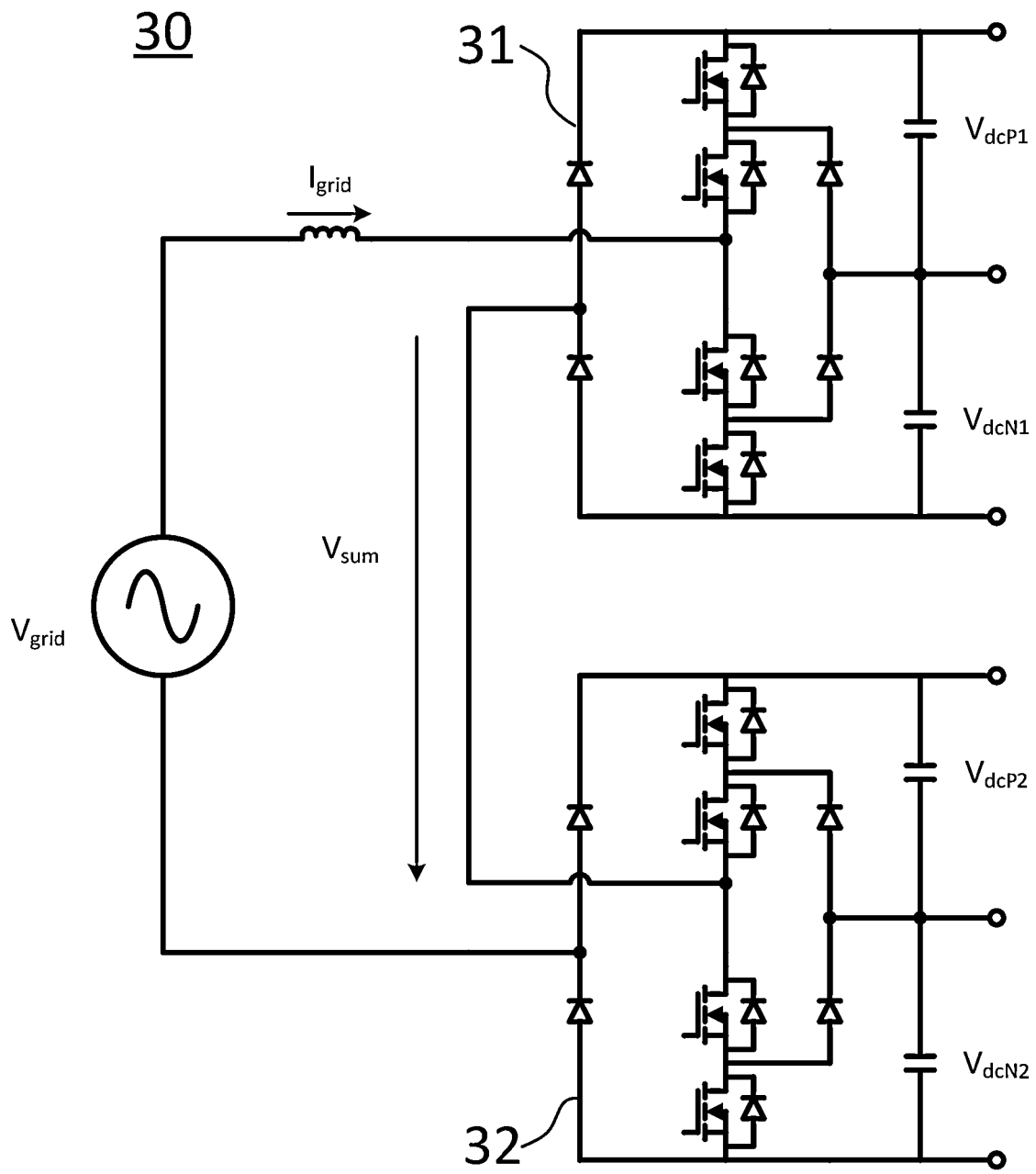
FIG. 15 illustrates a schematic diagram of two PFC circuits connected in series according to some embodiments of the application.

In some embodiments, connecting input ends of multiple PFC circuits according to the embodiments described above in series forms a medium voltage rectifier circuit for a high voltage power conversion system. For example, FIG. 15 illustrates a medium voltage rectifier circuit 30 with input ends of two bridgeless PFC circuits connected in series, and having two bridgeless PFC circuits 31 and 32 connected in series. Each of the two bridgeless PFC circuits 31 and 32 has the same structure as the circuit 10 shown in FIG. 2, or the circuit shown in FIG. 14. After the input ends of the two bridgeless PFC circuits are connected in series, a total bridge arm voltage is a five-level waveform, an equivalent switching frequency is twice of a switching frequency of a single bridgeless PFC circuit, and a voltage at neutral-point is balance.

Figure 16:
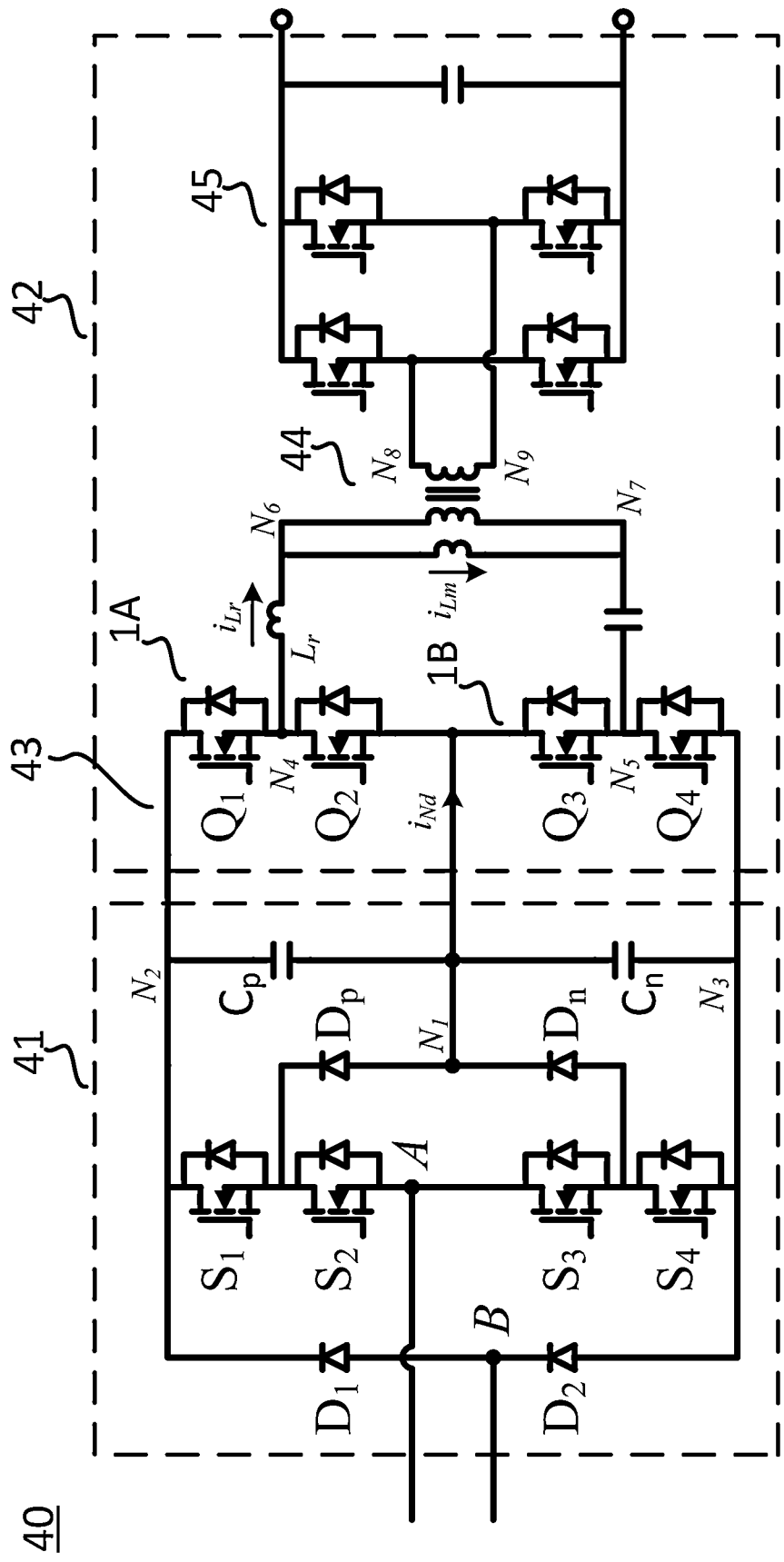
FIG. 16 illustrates a circuit diagram of a power conversion unit of a power conversion device according to some embodiments of the application.

A combination of the PFC circuit using the quasi two-level modulation strategy described above and a three-level DC/DC circuit forms one unit of a power conversion device (e.g., PET). FIG. 16 illustrates a circuit diagram of one power conversion unit 40 of a power conversion device according to one embodiment described in the application. As shown in FIG. 16, each power conversion unit 40 comprises cascaded bridgeless PFC circuit 41 and DC/DC circuit 42. The bridgeless PFC circuit 41 has the same structure as the PFC circuit 10 shown in FIG. 2, or the PFC circuit 20 shown in FIG. 14. A primary circuit of the DC/DC circuit 42 is a three-level bridge arm 43 formed by series half-bridge (SHB) circuit. The three-level bridge arm 43 is formed by four switches Q1-Q4 connected in series, and outputs three levels of voltage, referring as +2, +1 and 0 level. The topology is simple with high efficiency.

In an ideal case, when the bridgeless PFC circuit 41 works with quasi two-level modulation strategy, the input current flowing into or out from the neutral point N1 is extremely small, and its positive and negative half cycles are symmetrical, thus an average value of the current flowing into or out from the neutral point N1 is 0. In other words, when the DC/DC circuit 42 works with two-level modulation strategy, there is no neutral point current. However, in actual products, due to reasons of inconsistent parameters, and asynchronous driving and so on, producing a voltage bias between the DC-link, so voltages of the two capacitors Cp and Cn must be uniformly controlled.

As shown in FIG. 16, the first capacitor Cp of the bridgeless PFC circuit 41 has a first end as a node N1, and a second end as a node N2, and the second capacitor Cn of the bridgeless PFC circuit 41 has a first end as a node N1, and a second end as a node N3. The first switch Q1 and the second switch Q2 of the three-level bridge arm 43 form a bridge arm 1A coupled between the node N1 and the node N2, and the first switch Q1 and the second switch Q2 are connected in series to form a connection node N4. The third switch Q3 and the fourth switch Q4 of the three-level bridge arm 43 form a bridge arm 1B coupled between the node N1 and the node N3, and the third switch Q3 and the fourth switch Q4 are connected in series to form a connection node N5. A primary winding of a transformer 44 of the DC/DC circuit 42 is electrically connected to the node N4 and the node N5 through a node N6 and a node N7, respectively. A secondary circuit 45 of the DC/DC circuit 42 is electrically connected to a secondary winding of the transformer 44 through a node N8 and a node N9.

The controller (not shown) coupled to the capacitors Cp and Cn, the bridge arms 1A and 1B and the secondary circuit 45 outputs four signals, comprising a first control signal, a second control signal, a third control signal and a fourth control signal, according to a voltage difference between the capacitors Cp and Cn to control the first switch Q1, the second switch Q2, the third switch Q3 and the fourth switch Q4. The first control signal, the second control signal, the third control signal and the fourth control signal are all square signals having a preset period, the first control signal and the second control signal are complementary, and the third control signal and the fourth control signal are complementary. The first control signal and the fourth control signal have a first phase-shift angle therebetween, and the second control signal and the third control signal also have the first phase-shift angle therebetween. The controller reduces the voltage difference between the first capacitor Cp and the second capacitor Cn by controlling the first phase-shift angle.

Figure 17:
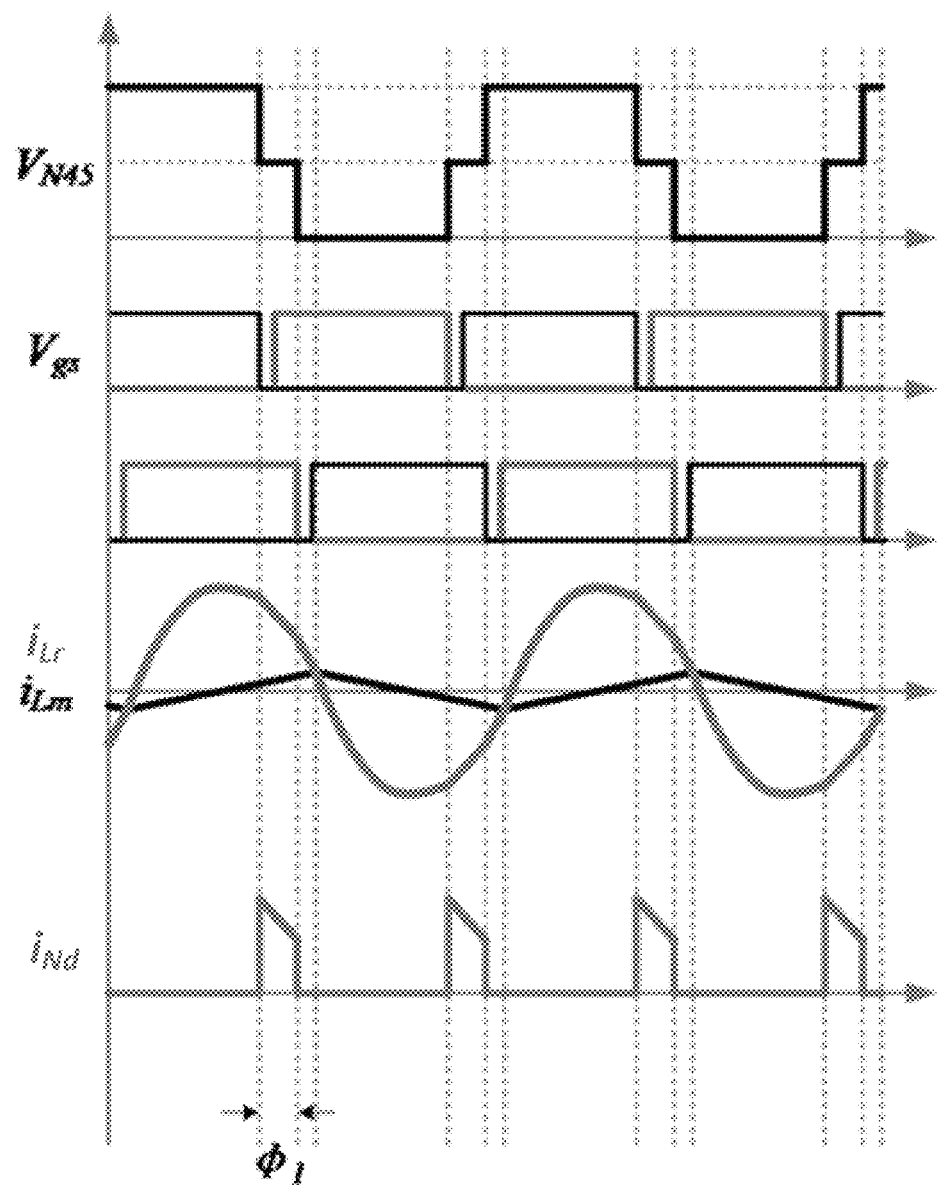
FIG. 17 illustrates a schematic diagram of a method for controlling neutral-point balance of a DC/DC converter in the power conversion unit according to some embodiments of the application.

FIG. 17 is a schematic diagram of a method for controlling the balance of neutral point of the DC/DC converter 42 of FIG. 16 provided in the application.

In FIG. 17, $V_{gs}$ is control signals of the switches Q1-Q4, $i_{Lr}$ is a current flowing through a primary circuit of the transformer 44, $i_{Lm}$ is a current in a magnetizing inductor of the transformer 44, and $i_{Nd}$ is the current flowing into or out of the node N1, i.e., a neutral point current.

Referring to FIG. 17, in the examples of the application, control signals for controlling the first switch Q1 and the second switch Q2 are turned on complementarily, and control signals of the third switch Q3 and the fourth switch Q4 are turned on complementarily. If a dead time is ignored, in an ideal case, duty cycles of the control signals of all switches are 50%, and the control signals of the switches Q1, Q2 and the control signals of the switches Q3, Q4 have a first phase-shift $\Phi_1$ therebetween. When the fourth switch Q4 is defined to turn on after the first switch Q1, the first phase-shift angle is positive, and when the fourth switch Q4 is defined to turn on before the first switch Q1, the first phase-shift angle is negative. In the embodiments of the application, such method is referred to as phase-shift modulation method.

If the dead time is not considered, the three-level bridge arm 43 forms four modulation modes within one switching cycle, and taking the positive first phase-shift angle as an example, referring to FIG. 17, When the switches Q1, Q4 are both in on-state, the two capacitors Cp and Cn are connected in series to the converter, a total output voltage of the bridge arms 1A and 1B is ($V_{dcP}+V_{dcN}$), an output level is 2, the neutral point (the node N1) is not connected to the circuit, the mode has no influence on the potential at the neutral point.

When the switches Q2, Q3 are both in on-state, the two capacitors Cp and Cn are not connected to the converter, a total output voltage of the bridge arms 1A and 1B is 0, the output level is 0, and the neutral point (the node N1) is not connected to the circuit, the mode has no influence on the potential at the neutral point.

When the switches Q1, Q3 are both in on-state, a total output voltage of the bridge arms 1A and 1B is $V_{dcP}$ and the output level is 1, the neutral point (the node N1) is connected to the circuit, and a primary current $i_{Lr}$ of the DC/DC circuit flows out from the neutral point via the two switches Q1, Q3.

When the switches Q2, Q4 are both in on-state, a total output voltage of the bridge arms 1A and 1B is $V_{dcN}$ and the output level is 1, the neutral point (the node N1) is connected to the circuit, and the primary current $i_{Lr}$ of the DC/DC circuit flows out from the neutral point via the two switches Q2, Q4.

In the four working modes described above, 0-level-modulation-mode and the 2-level-modulation-mode have no influence on the potential at the neutral point. When the primary circuit of the DC/DC circuit is operating in the 0-level-modulation-mode and the 2-level-modulation-mode, the DC/DC circuit 42 itself does not have the capability of regulating the potential at the neutral point. Therefore, when the potential balance of the neutral point is required, the 1-level-modulation-mode must be used reasonably to adjust the voltage of the neutral point.

In the control method shown in FIG. 17, the three-level bridge arm 43 experiences the 1-level-modulation mode twice within one switching cycle. When the first phase-shift angle is positive, the current always flows out from the neutral point. The charging of first capacitor Cp and the discharging of the second capacitor Cn urge the potential at the neutral point to decrease and a voltage difference between the two capacitors is decreased. When the phase-shift angle is negative, the current always flows into the neutral point. The charging of the second capacitor Cn and the discharging of the first capacitor Cp urge the potential at the neutral point to increase and a voltage difference between the two capacitors is decreased.

Therefore, the phase-shift angle of the two bridge arms determines the direction of the current flowing through the neutral point. The larger the phase-shift angle is, the longer the duration of the 1-level-modulation-mode will be, thus caused the longer the duration of the current flowing through the neutral point and the higher an average value of the current flowing through the midpoint, that means the regulating capability of the strategy is stronger. In these embodiments described above, the neutral point balance is achieved by decreasing the first phase-shift angle when the voltage difference between the two capacitors Cp and Cn is positive, and increasing the first phase-shift angle when the voltage difference between the two capacitors Cp and Cn is negative.

Although the above disclosures are directed to the embodiments, without departing from the substantial scope, other and further embodiments can be designed, and such scope is determined by the appended claims.

What is claimed is:

1. A method for controlling a PFC circuit, comprising:
providing the PFC circuit, wherein the PFC circuit comprises a diode bridge arm, a DNPC bridge arm and a capacitor group, the diode bridge arm, the diode neutral point clamped (DNPC) bridge arm and the capacitor group are electrically connected in parallel, the DNPC bridge arm comprises a first switch, a second switch, a third switch and a fourth switch connected in series sequentially and a clamped diode branch, a first connection node is defined by the junction node between the first switch and the second switch, a second connection node is defined by the junction node between the third switch and the fourth switch, one end of the clamped diode branch is connected to the first connection node, the other end of the clamped diode branch is connected to the second connection node, a midpoint of the clamped diode branch is coupled to a midpoint of the capacitor group;
switching a working mode of the PFC circuit back and forth between a first mode and a third mode via a second mode in each switching cycle at times when a positive half cycle of a modulation wave is modulated; and
switching the working mode of the PFC circuit back and forth between a sixth mode and a fourth mode via a fifth mode in each switching cycle at times when a negative half cycle of the modulation wave is modulated; wherein
in the first mode, the first switch and the second switch in the DNPC bridge arm are in on-state, in the second mode, the third switch in the DNPC bridge arm is in on-state, and in the third mode, the third switch and the fourth switch in the DNPC bridge arm are in on-state, an input current of the PFC circuit flows into a neutral point of the DNPC bridge arm during the positive half cycle, and
in the sixth mode, the third switch and the fourth switch in the DNPC bridge arm are in on-state, in the fifth mode, the second switch in the DNPC bridge arm is in on-state, and in the fourth mode, the first switch and the second switch in the DNPC bridge arm are in on-state, the input current flows out from the neutral point of the DNPC bridge arm during the negative half cycle.

2. The control method according to claim 1, wherein
when the working mode of the PFC circuit is switched back and forth between the first mode and the third mode via the second mode, an operating duration of the PFC circuit under the second mode is smaller than or equal to 10% of each switching cycle, and
when the working mode of the PFC circuit is switched back and forth between the sixth mode and the fourth mode via the fifth mode, an operating duration of the PFC circuit under the fifth mode is smaller than or equal to 10% of each switching cycle.

3. The control method according to claim 1, wherein,
the first switch and the third switch are switched complementarily, and a dead time between the first switch and the third switch is greater than or equal to a commutation time of the first switch or the third switch, and
the second switch and the fourth switch are switched complementarily, and a dead time between the second switch and the fourth switch is greater than or equal to a commutation time of the second switch or the fourth switch.

4. The control method according to claim 1, further comprising at least one of following steps:
  turning off the fourth switch firstly, turning on the second switch secondly, turning off the third switch thirdly, and turning on the first switch lastly at times when the working mode of the PFC circuit is switched from the third mode to the first mode via the second mode;
  turning off the first switch firstly, turning on the third switch secondly, turning off the second switch thirdly, and turning on the fourth switch lastly at times when the working mode of the PFC circuit is switched from the first mode to the third mode via the second mode;
  turning off the fourth switch firstly, turning on the second switch secondly, turning off the third switch thirdly, and turning on the first switch lastly at times when the working mode of the PFC circuit is switched from the sixth mode to the fourth mode via the fifth mode;
  turning off the first switch firstly, turning on the third switch secondly, turning off the second switch thirdly, and turning on the fourth switch lastly at times when the working mode of the PFC circuit is switched from the fourth mode to the sixth mode via the fifth mode.

5. The control method according to claim 4, further comprising at least one of the following steps:
  when the working mode of the PFC circuit is switched from the third mode to the first mode, a duration between a step of turning on the second switch and a step of turning off the third switch is less than or equal to 10% of each switching cycle;
  when the working mode of the PFC circuit is switched from the first mode to the third mode, a duration between a step of turning on the third switch and a step of turning off the second switch is less than or equal to 10% of each switching cycle;
  when the working mode of the PFC circuit is switched from the sixth mode to the fourth mode, a duration between a step of turning on the second switch and a step of turning off the third switch is less than or equal to 10% of each switching cycle;
  when the working mode of the PFC circuit is switched from the fourth mode to the sixth mode, a duration between a step of turning on the third switch and a step of turning off the second switch is less than or equal to 10% of each switching cycle.

6. The control method according to claim 1, further comprising at least one of following steps:
  turning off the fourth switch firstly, turning off the third switch secondly, turning on the second switch thirdly, and turning on the first switch lastly at times when the PFC circuit is switched from the third mode to the first mode via the second mode;
  turning off the first switch firstly, turning off the second switch secondly, turning on the third switch thirdly, and turning on the fourth switch lastly at times when the PFC circuit is switched from the first mode to the third mode via the second mode;
  turning off the fourth switch firstly, turning off the third switch secondly, turning on the second switch thirdly, and turning on the first switch lastly at times when the PFC circuit is switched from the sixth mode to the fourth mode via the fifth mode;
  turning off the first switch firstly, turning off the second switch secondly, turning on the third switch thirdly, and turning on the fourth switch lastly at times when the PFC circuit is switched from the fourth mode to the sixth mode via the fifth mode.

7. The control method according to claim 6, further comprising at least one of the following steps:
  when the working mode of the PFC circuit is switched from the third mode to the first mode, a duration between a step of turning on the second switch and a step of turning off the third switch is less than or equal to 10% of each switching cycle;
  when the working mode of the PFC circuit is switched from the first mode to the third mode, a duration between a step of turning on the third switch and a step of turning off the second switch is less than or equal to 10% of each switching cycle;
  when the working mode of the PFC circuit is switched from the sixth mode to the fourth mode, a duration between a step of turning on the second switch and a step of turning off the third switch is less than or equal to 10% of each switching cycle;
  when the working mode of the PFC circuit is switched from the fourth mode to the sixth mode, a duration between a step of turning on the third switch and a step of turning off the second switch is less than or equal to 10% of each switching cycle.

8. The control method according to claim 6, wherein each of the second switch and the third switch connected with an impedance in parallel respectively, and a resistance of the impedance satisfies $$Z_a \leq \frac{1}{j\omega C_d},$$

wherein $Z_a$ is the resistance of the impedance, and $C_d$ is capacitance of a parasitic capacitor of a clamped diode in the clamped diode branch.

9. A PFC circuit, comprising:
  a diode bridge arm comprising a first diode and a second diode connected in series, the junction node of the first diode and the second diode is defined as a midpoint of the diode bridge arm;
  a diode neutral point clamped (DNPC) bridge arm connected in parallel to the diode bridge arm, comprising a first switch, a second switch, a third switch and a fourth switch and a clamped diode branch, wherein the first switch, the second switch, the third switch and the fourth switch connected in series sequentially, a first connection node is defined by the junction node between the first switch and the second switch, a second connection node is defined by the junction node between the third switch and the fourth switch, one end of the clamped diode branch is connected to the first connection node, and the other end of the clamped diode branch is connected to the second connection node;
  a capacitor group connected in parallel to the diode bridge arm and the DNPC bridge arm, comprising a first capacitor and a second capacitor connected in series, the junction node of the first capacitor and the second capacitor is defined as a midpoint of the capacitor group, and the midpoint of the clamped diode branch is coupled to the midpoint of the capacitor group; and
  a controller, configured to switch the working modes of the PFC circuit, wherein:
    the controller controls to switch the working mode of the PFC circuit back and forth between first mode and third mode via second mode in each switching cycle at times when a positive half cycle of a modulation wave is modulated; and the controller controls to switch the working mode of the PFC circuit back and forth between sixth mode and fourth mode via fifth mode in each switching cycle at times when a negative half cycle of the modulation wave is modulated; wherein in the first mode, the first switch and the second switch in the DNPC bridge arm are in on-state, in the second mode, the third switch in the DNPC bridge arm is in on-state, and in the third mode, the third switch and the fourth switch in the DNPC bridge arm are in on-state, an input current of the PFC circuit flows into a neutral point of the DNPC bridge arm during the positive half cycle, and in the sixth mode, the third switch and the fourth switch in the DNPC bridge arm are in on-state, in the fifth mode, the second switch in the DNPC bridge arm is in on-state, and in the fourth mode, the first switch and the second switch in the DNPC bridge arm are in on-state, the input current flows out from the neutral point of the DNPC bridge arm during the negative half cycle.

10. The PFC circuit according to claim 9, wherein, when the working mode of the PFC circuit is switched back and forth between the first mode and the third mode via the second mode, an operating duration of the PFC circuit under the second mode is smaller than or equal to 10% of each switching cycle, and when the working mode of the PFC circuit is switched back and forth between the sixth mode and the fourth mode via the fifth mode, an operating duration of the PFC circuit under the fifth mode is smaller than or equal to 10% of each switching cycle.

11. The PFC circuit according to claim 9, wherein the controller is further configured to execute at least one of the following steps:

turning off the fourth switch firstly, turning on the second switch secondly, turning off the third switch thirdly, and turning on the first switch lastly at times when the working mode of the PFC circuit is switched from the third mode to the first mode via the second mode;

turning off the first switch firstly, turning on the third switch secondly, turning off the second switch thirdly, and turning on the fourth switch lastly at times when the working mode of the PFC circuit is switched from the first mode to the third mode via the second mode;

turning off the fourth switch firstly, turning on the second switch secondly, turning off the third switch thirdly, and turning on the first switch lastly at times when the working mode of the PFC circuit is switched from the sixth mode to the fourth mode via the fifth mode;

turning off the first switch firstly, turning on the third switch secondly, turning off the second switch thirdly, and turning on the fourth switch lastly at times when the working mode of the PFC circuit is switched from the fourth mode to the sixth mode via the fifth mode.

12. The PFC circuit according to claim 9, wherein the controller is further configured to execute at least one of the following steps:

turning off the fourth switch firstly, turning off the third switch secondly, turning on the second switch thirdly, and turning on the first switch lastly at times when the PFC circuit is switched from the third mode to the first mode via the second mode;

turning off the first switch firstly, turning off the second switch secondly, turning on the third switch thirdly, and turning on the fourth switch lastly at times when the PFC circuit is switched from the first mode to the third mode via the second mode;

turning off the fourth switch firstly, turning off the third switch secondly, turning on the second switch thirdly, and turning on the first switch lastly at times when the PFC circuit is switched from the sixth mode to the fourth mode via the fifth mode;

turning off the first switch firstly, turning off the second switch secondly, turning on the third switch thirdly, and turning on the fourth switch lastly at times when the PFC circuit is switched from the fourth mode to the sixth mode via the fifth mode.

13. The PFC circuit according to claim 12, wherein each of the second switch and the third switch is connected with an impedance in parallel, and a resistance of the impedance satisfies $$Z_a \leq \frac{1}{j\omega C_d},$$

wherein $Z_a$ is the resistance of the impedance, and $C_d$ is capacitance of a parasitic capacitor of a clamped diode in the clamped diode branch.

14. A power conversion device, comprising:

a power conversion unit, wherein the power conversion unit comprises the PFC circuit according to claim 9;

a first bridge arm connected in parallel to the first capacitor of the PFC circuit, comprising a fifth switch and a sixth switch connected in series;

a second bridge arm connected in parallel to the second capacitor of the PFC circuit, comprising a seventh switch and an eighth switch connected in series;

a transformer comprising a primary winding and a secondary winding, wherein one end of the primary winding is connected to a junction node between the fifth switch and the sixth switch, and the other end of the primary winding is connected to a junction node between the seventh switch and the eighth switch; and a secondary circuit connected to the secondary winding of the transformer.

15. The power conversion device according to claim 14, further comprising:

a controller, wherein the controller is configured to:

output a first control signal, a second control signal, a third control signal and a fourth control signal to the control terminals of the fifth switch, the sixth switch, the seventh switch and the eighth switch, respectively, wherein the first control signal, the second control signal, the third control signal and the fourth control signal are square-wave signals with a preset period, the first control signal and the second control signal are complementary, the third control signal and the fourth control signal are complementary, the first control signal and the fourth control signal have a first phase-shift angle therebetween, and the second control signal and the third control signal have the first phase-shift angle therebetween; and control the first phase-shift angle to decrease a voltage difference between the first capacitor and the second capacitor of the PFC circuit.

16. The power conversion device according to claim 15, wherein:

the controller is further configured to detect a first voltage of the first capacitor and a second voltage of the second capacitor, respectively; and to determine the first phase-shift angle according to the voltage difference between the first voltage and the second voltage, decrease the first phase-shift angle while the voltage difference is positive, increase the first phase-shift angle while the voltage difference is negative.

17. The power conversion device according to claim 14, further comprising a plurality of power conversion units, wherein the inputs of the power conversion units are sequentially connected in series.

* * * * *